United States Patent [19]

Vogt et al.

[11] Patent Number: 4,507,652

[45] Date of Patent: Mar. 26, 1985

[54] BIDIRECTIONAL, INTERACTIVE FIRE DETECTION SYSTEM

[75] Inventors: William R. Vogt, Rockaway; John M. Wynne, Oak Ridge, both of N.J.

[73] Assignee: Baker Industries, Inc., Parsippany, N.J.

[21] Appl. No.: 589,792

[22] Filed: Mar. 15, 1984

Related U.S. Application Data

[62] Division of Ser. No. 345,909, Feb. 4, 1982, Pat. No. 4,470,047.

[51] Int. Cl.[3] ........................ H04Q 9/00; G08B 29/00

[52] U.S. Cl. .................................... 340/501; 340/505; 340/825.36

[58] Field of Search ............... 340/505, 510, 511, 522, 340/593, 594, 599, 825.36, 825.37, 501, 870.04

[56] References Cited

U.S. PATENT DOCUMENTS

| | | | |
|---|---|---|---|
| 3,702,474 | 11/1972 | Fink et al. | 340/511 |
| 4,006,460 | 2/1977 | Hewitt et al. | 340/511 |
| 4,196,417 | 4/1980 | Fasching et al. | 340/870.04 |
| 4,361,833 | 11/1982 | Allgood | 340/511 |
| 4,385,287 | 5/1983 | Eatwell | 340/505 |
| 4,404,548 | 9/1983 | Muller et al. | 340/511 |

*Primary Examiner*—Donald J. Yusko

*Attorney, Agent, or Firm*—James J. Jennings, Jr.

[57] ABSTRACT

A Communication System useful for fire detection which transfers data/commands bidirectionally between a controller and connected transponders on a real time, interactive basis. This system makes possible accurate data recovery, whether a transponder has its output shorted, or although multiple transponders are replying and makes possible the remote determination and constant monitoring of transducer sensitivity, at the controller. The sensitivity can be adjusted remotely at the controller, and different transducers can have different thresholds simultaneously, which can be changed collectively or individually to different settings manually or automatically at the controller. The system transmits reference data for supervision of system accuracy. Compensation for long-term changes is provided for both transponders and transducers in this system.

19 Claims, 32 Drawing Figures

FIG. 1 (PRIOR ART)
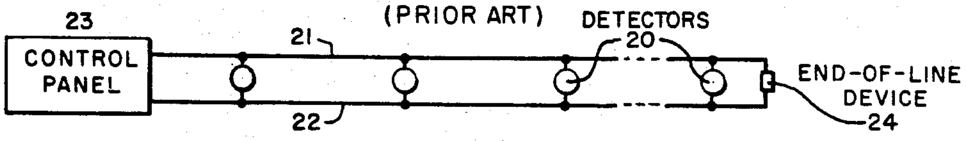
FIG. 2
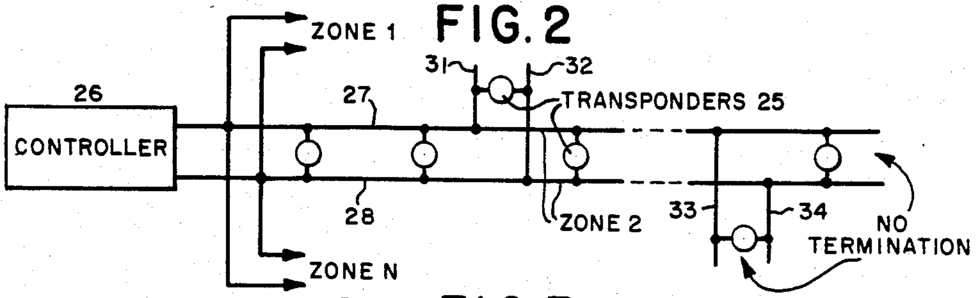
FIG. 3
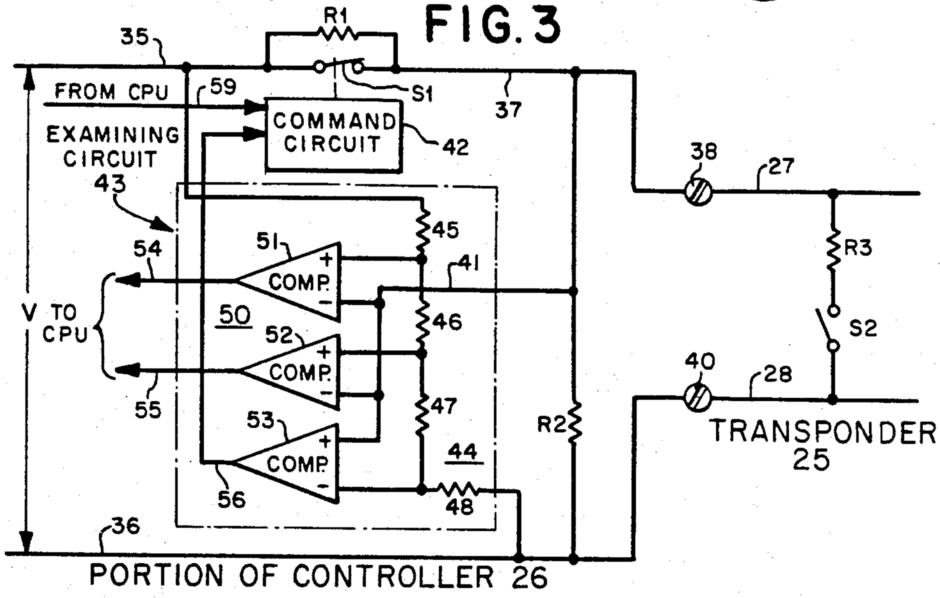
FIG. 4
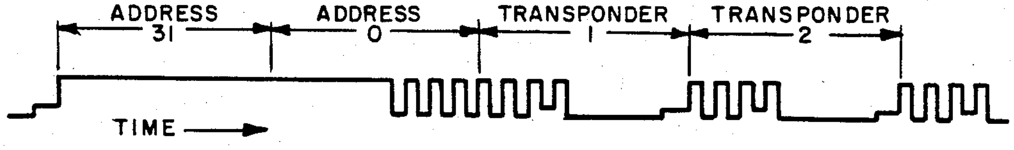
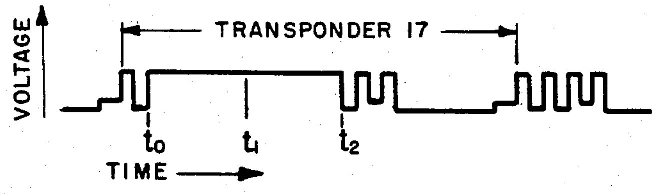
FIG. 5

ONE TRANSPONDER RETURNING INFORMATION

ONE TRANSPONDER RETURNING INFORMATION, ANOTHER TRANSPONDER'S OUTPUT SHORTED

TWO TRANSPONDERS RESPONDING AT SAME TIME

TRANSPONDER 25

BIDIRECTIONAL, INTERACTIVE FIRE DETECTION SYSTEM

This application is a division of the parent application with the same title, inventors and assignee, Ser. No. 345,909, filed Feb. 4, 1982 now U.S. Pat. No. 4,470,047.

RELATED APPLICATIONS

This application discloses and claims improvements on an earlier system of applicants' described in an application with the same title and assignee, filed Mar. 13, 1981, having Ser. No. 243,401, which issued July 19, 1983 as U.S. Pat. No. 4,394,655.

BACKGROUND OF THE INVENTION

Various detectors and systems have been developed to detect and indicate the presence of particles of combustion, or of a fire, or of an increase in temperature. Such systems generally use two or more conductors between a control panel or control unit, which is coupled to the individual detectors. In general, the individual detectors determine when an undesired condition is present, by comparing some parameter (such as current flow or voltage level) with a predetermined reference value. When the detector determines the reference value has been exceeded, the undesired condition is present and the detector latches in the alarm condition. Generally the control unit does not know the precise location of the alarmed detector, and after three or more detectors have gone into alarm on one zone, cannot recognize how many detectors are in the alarmed condition on that zone.

Prior art detectors generally are not capable of having their sensitivity checked from the control panel over a two-wire loop, or having their sensitivity adjusted from the control panel without taking the system out of operation.

A serious shortcoming of prior art systems is that loop continuity is supervised, but detector presence and/or operation is not supervised. If any detector is removed and replaced by a cardboard form or some other mechanical unit to simulate detector presence, continuity along the conductor pair is maintained and the control unit does not "know" that the detector is in fact missing from the area.

Several of these shortcomings were overcome in the system described and claimed in the earlier application noted above. That system includes a bidirectional, interactive fire detection system in which only a single conductor pair is required. The control panel (or controller) selectively addresses the individual transponders, and each transponder responds when addressed. The controller also issues command signals to the addressed transponder, which command signals represent desired functions or actions to be taken by the selectively addressed transponder, which then accomplishes the functions or actions. Such command signals can control the operation of various devices coupled to the transponder, such as relays, visual and/or audible indicators, or any other device.

In the system described in the earlier application the transponder returns a signal which identifies the type of transducer associated with that transponder. For example, the transducer could be an ionization detector, a photoelectric detector, alarm-causing switches (such as a manual pull station or a thermal switch), non-alarm-causing switches (such as an abort control for Halon, or day-night switches) or a complete zone of detectors. This return signal is termed the "identification response".

The transducer also returns a "transducer response", a signal from which the controller determines the transducer sensitivity. Successive transducer response signals can be recorded to provide a continuing record of transducer sensitivity, as described in the earlier application. In the system of this invention, it is desirable to compensate for changes in the transducer response signal.

Even with the significant improvements just described in connection with the earlier system, there are areas in which such a bidirectional, interactive system can be further improved. It is highly desirable that the transponder return a reference signal from which the controller can determine that the transponder is functioning properly. This signal will be referred to as the "calibration response". In addition, it is desirable that the system be equipped to compensate for changes in the calibration response signal, and further that at least certain transducers be capable of selective and remote calibration.

Also very important is that the transponder return signal, the "transducer response" from which the controller determines the transducer sensitivity, be used in a manner to provide adjustable sensitivity of the transducer.

Another important consideration is that the improved system be useful to control a multi-zone system.

In addition, where a plurality of zones are coupled to the same two common terminals, it is desirable to identify the separate zones one from another. The "identification response" signal can be used to provide this identification of the individual zones.

Another significant consideration is that the controller of the system should be able to "read through a short", that is, discern usable and significant information when a transponder is replying over the conductor pair, even though one or more additional transponders may inadvertently have its output fail in an open or shorted state when the addressed transponder is replying.

Yet another important consideration is that the system be able to poll the transponders at a time when the controlled premises are substantially unoccupied and quiescent (for example, 2:00 a.m. Sunday), to obtain and/or store various reference data.

Another desirable advantage of the improved system is that it be able to identify the precise location of a break in one wire of the conductor pair.

Another important consideration of the improved system is that it be able to measure the analog representation of the signal returned from the transponder with a greater accuracy than would be possible with a simple, coarse measuring arrangement, without imposing the requirement of greater accuracy on the system over the entire information-return time interval.

Yet another important consideration is that the new system be capable of providing a compensation signal to the controller as a function of various conditions, such as component aging, wind velocity, temperature, humidity, supply voltage at the associated transducer, and so forth.

A bidirectional, interactive system for detecting and indicating a predetermined condition, such as the presence of fire or products of combustion, when constructed according to the teaching of the earlier application, need employ only two conductors. A controller and a plurality of transponders are each coupled to the same conductor pair, without any need for an end-of-line resistor or other termination unit, or without any other means for supplying power to the transponders and/or transducers. The controller sends out a series of signal groups or sets, with each signal group addressing a particular transponder. One or more of the signals in a given group can be modified by the controller to pass information to the addressed transponder. Each transponder has a unique address and, when it recognizes its own address, can return information to the controller by modifying some characteristic of one signal directed back to the controller. It is important that each transponder does not depend on the proper operation of the other transponders for receiving or sending information. Each transponder can return information concerning the identification and condition of associated transducers.

SUMMARY OF THE INVENTION

Particularly in accordance with the present invention, the controller includes means for operating upon a transponder-response signal to derive an "answer" signal. The answer signal is a function of both the time duration and the amplitude of the transponder-response signal. The answer signal is then examined to determine whether a particular transducer has returned a signal implying alarm, trouble, or some other condition. The sensitivity level—or alarm threshold—can be simply adjusted in the controller. In addition the answer signal provides the desired calibration response from the transponder, in answer to the appropriate command from the controller. The system compensates for changes in the calibration response as well as in the transducer response, and allows the individual transducers to be selectively and remotely calibrated, in real time, without affecting system operation during the calibration interval.

The answer signal is provided from each zone in a multi-zone system, and thereafter processed to provide the desired information (such as alarm, trouble, "read through a short" (where a "short" means a shorted output driver), or whatever is desired). The "reading-through-a-short" capability is included in the amplitude-responsive portion of the circuitry which produces the answer signal.

In accordance with an important aspect of the invention, the "answer" signal is derived by using both vernier and coarse measuring circuits during the response period, with the vernier or fine counting only used for a portion of this response interval to enhance the accuracy of the answer signal.

In addition, the system provides a compensation signal which can modify the processed information as a function of different variables, such as changes in wind velocity, temperature, humidity, supply voltage to a transducer coupled to a transponder, and so forth.

THE DRAWINGS

In the several figures of the drawings, like reference numerals identify like components, and in those drawings:

FIG. 1 is a block diagram of a prior art fire detection system;

FIG. 2 is a block diagram of a fire detection and signalling system constructed in accordance with the principles of the inventive system disclosed and claimed in the above-identified, earlier-filed application;

FIG. 3 is a simplified schematic illustration of the controller and one transponder of the system of this invention;

FIGS. 4 and 5 are graphical illustrations useful in understanding operation of the earlier system, and of the present invention;

FIGS. 18, 19A–19F, and 20A–20F are graphical illustrations useful in understanding the invention.

GENERAL BACKGROUND DESCRIPTION OF THE EARLIER SYSTEM

Figure 6A:
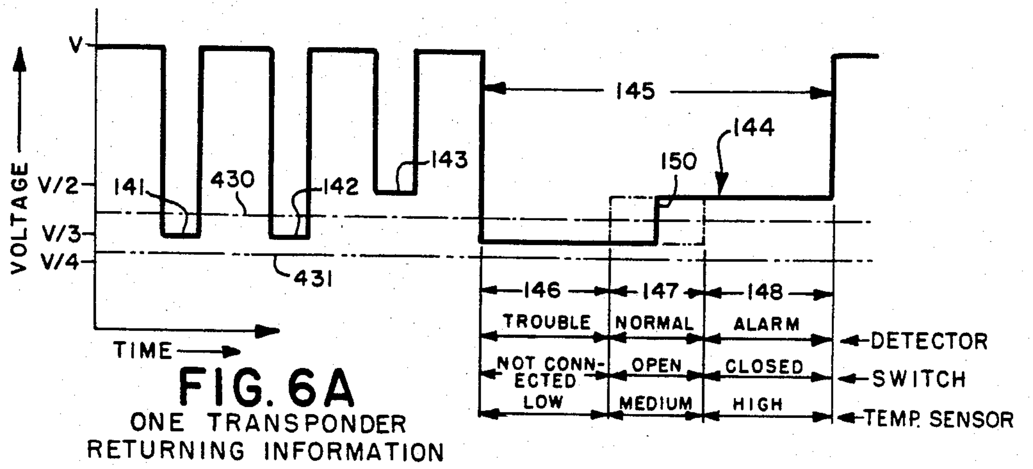
FIGS. 6A, 6B and 6C are graphical illustrations, taken on a scale enlarged relative to that of FIGS. 4 and 5, useful in understanding operation of the present invention.

To provide a comprehensive teaching document, some of the background and explanatory material from the earlier application is repeated here. FIG. 1 depicts a known arrangement of a plurality of detectors 20 coupled between a pair of conductors 21, 22. A control panel 23 is coupled to the conductor pair for supervising the loop, and an end-of-line device 24 is connected across the conductor pair to provide a termination. This affords continuity of current flow along the lines. In such arrangement the actual detection is accomplished by one of the detectors sensing the fire or presence of particulate matter, going into alarm and providing a change in voltage or current on the conductor pair which is detected at the control panel. With such an arrangement it is not possible to determine the exact location of the alarm condition, but only the loop (completed by conductors 21, 22) on which the alarm condition has occurred.

FIG. 2 depicts an arrangement according to the earlier system, showing a plurality of transponders 25 rather than simple detectors, connected to operate in conjunction with a controller 26, coupled to the same conductor pair 27, 28 to which the transponders are connected. The term "transponder" as used herein and in the appended claims signifies a unit which can control and/or monitor some condition and/or associated component which may or may not be adjacent its physical location, is selectively addressed by the controller and recognizes not only its address but additionally other information which may be transmitted from the controller, such as command signals for controlling the operation of the transponder itself and/or various associated devices. In addition the transponder itself transmits information, such as the transducer response and identification response, back to the controller. Thus, the transponders 25 truly interact with the controller to provide a bidirectional, interactive system. Each transponder is not a passive device which merely transmits some signal when activated by a master transmitter. It is also emphasized that there are no terminations at the end of the conductor pair 27, 28, or on either of the other pairs 31, 32 and 33, 34 which branch off from the main pair 27, 28 in zone 2. It will become apparent that such branching is possible without regard either to physical location or to the order in which each transponder is addressed. Such an arrangement, with no requirement for termination at the end of any conductor pair, provides a system which is simple and economical to install and operate.

FIG. 3 depicts in simplified form the manner in which interactive signalling is accomplished between controller 26 and one of the transponders 25. As there shown, controller 26 operates with a reference voltage V applied between conductors 35, 36. Conductor 35 is coupled through a resistor R1 to conductor 37, which is connected over a connecting screw 38 to conductor 27. Conductor 36 in the controller is connected over a screw 40 to line conductor 28. In the controller a switch S1 is coupled in parallel with a resistor R1. Another resistor R2, is connected between conductors 37 and 36. A sensing conductor 41 has one end connected between resistor R2 and conductor 37, to provide an indication of the voltage across resistor R2.

In the transponder, a resistor R3 has one end coupled to conductor 27, and its other end coupled through another switch S2 to conductor 28. In this preferred embodiment all of resistors R1, R2 and R3 are the same resistance value. However, those skilled in the art will appreciate other values and/or ratios can be selected without departing from the principles of this invention. A command circuit 42 regulates the opening and closing of switch S1, and other components in transponder 25 (not shown) regulate the open and closed times of S2. The remaining components depicted in FIG. 3 will be described hereinafter.

The interactive communication, as explained in the earlier application, is accomplished with the modification of at least one characteristic, such as voltage amplitude or the time duration of a signal, or the modulation of more than one such characteristic, such as both time and amplitude. The amplitude of the voltage used in signalling is simply controlled by switches S1 and S2. Switch S1 is closed to "send" each signal or pulse in each signal group of pulses from the controller over the conductor pair 27, 28. With switch S1 closed, a voltage of amplitude V is passed over conductors 27, 28 to all the transponders. The duration of switch closure can also be recognized at the transponder, as can the number of times switch S1 is opened and closed in each group of signals or pulses.

In the case where R1, R2 and R3 are of equal resistance, and with switch S1 open and switch S2 open, the voltage on sense conductor 41 is V/2, determined by the resistance bridge including resistances R1 and R2. Thus when transponder 25 is answering back to the controller, a voltage V/2 received on sense conductor 41 signifies switch S2 is open. When S2 is closed, while S1 remains open, this places R3 in parallel with R2, and this parallel combination is in series with R1 to determine the voltage at conductor 41. Thus with switch S2 closed, sense conductor 41 "sees" a voltage level of V/3 returned to the controller. Additionally the number of switch openings and closings are also readily determined in the controller.

Closure time of S2, while S1 remains open, can be made a function of a signal developed by an associated transducer (not shown), or can be made a function of any desired information-bearing signal. By measuring the time duration of the S2 closure time, the information represented by the original signal can be determined. Closure time of S1 can be regulated to control issuance of command signals from the controller to the transponders.

Controller 26 derives information from the transponder replying by measuring the time duration of S2 closure, or time duration of voltage V/3 appearing across R2. An important aspect of the invention is that significant information can still be derived by the controller, when one or more additional transponders are replying concomitantly with the addressed transponder. To this end it is important that controller 26 be able to discern when—and how much—the voltage on sense conductor 41 falls below V/3. Accordingly, controller 26 includes a signal examining circuit 43 to make this determination. In examining circuit 43 is a voltage divider circuit 44, including four resistors 45, 46, 47 and 48 connected in series between a source of unidirectional voltage and ground. An array 50 of comparators 51, 52, and 53 is provided and connected as shown, with one input of each comparator coupled to sense conductor 41 and the other input coupled to a connection in voltage divider circuit 44. Comparator 51 is connected to provide an output signal on conductor 54 when the signal on sense conductor 41 is V/3 or less (plus or minus a suitable tolerance). This signifies at least one transponder is replying by closing its switch S2. In accordance with an important aspect of the invention, comparator 52 is connected to provide an output signal on conductor 55 when the signal on sense conductor 41 is V/4 or less (again, plus or minus an appropriate tolerance value). Such an output signal indicates two or more transponders are replying, each closing its switch S2 and placing its respective resistor R3 in parallel with R2. By making a logical comparison of the output signals on lines 54 and 55 at any given instant, the presence of a signal on line 54 with no signal on line 55 indicates that one, and only one, transponder is then replying over the lines 27, 28. Also important is the connection of comparator 53 to provide an output signal over line 56 to command circuit 42 whenever the amplitude of the signal on sense conductor 41 is at a level of V/5, or less. This denotes three or more transponders are replying, or there is a short across line conductors 27, 28. Under such conditions the output signal on line 56 is used to shut down command circuit 42 and indicate the trouble condition. By making a logical comparison between the presence of a signal on line 55, from comparator 52, and a determination that the command circuit 42 has not been shut down, it is possible to determine that two transponders are responding (signal on line 55) and also that a third transponder is not responding at this time, because such a condition (third transponder replying) would have been indicated by a signal returned over line 56 to shut down command circuit 42.

Those skilled in the art will appreciate that the number of comparators 'n' in examining circuit 43 of FIG. 3 (where in the illustrated embodiment $n=3$), $n-1$ number of transponders replying may be specifically identified, while n or more transponders replying, or a short across conductors 27 and 28, is considered an unacceptable operating condition, which is identified by a signal on line 56 out of comparator 53.

To better understand the system operation, a description of the signal groups transmitted from the controller and returned by the transponder will be helpful. FIG. 4 indicates a series of signal groups for sequential passage over line conductors 27, 28 to the different transponders connected across these conductors. Each signal group such as the group shown under the legend "transponder 1", includes the same number of pulses. In a preferred embodiment four pulses were used in each group for one transponder address, but those skilled in the art will appreciate that a different number of pulses can be utilized. The extended pulse at the high amplitude level shown under "address 31" and the first portion of "address 0" indicates a reset action, and is also used to charge up a component in the transponder to provide energization of that transponder throughout the polling cycle. As will become apparent, each transponder includes a counter circuit to accumulate the number of pulse groups sent over the line conductors, and thus recognize when its address is indicated by the controller. All the high level pulses (after address 0) shown in FIG. 4 are of short duration, signifying that no command signal was sent by the controller but only different addresses, as indicated by the number of pulse groups.

FIG. 5 illustrates the manner in which one pulse group is modified to pass a command signal to a particular transponder. As there shown, when the seventeenth transponder is being signaled, the second pulse in the group has its high level portion extended for a considerable time, which may be 40 milliseconds. The precise time is not critical, because each transponder can include a simple timer to determine when the pulse amplitude has remained high for a minimum time, represented in FIG. 5 by the distance between $t_0$ and $t_1$. This time was about 20 milliseconds in the preferred embodiment, representing a "wait" period. Because the transponder recognizes that this is the second incoming pulse, it knows the action to be taken if the pulse high is stretch beyond the "wait" time $t_1$. Suppose the elongation of the second pulse denotes a command to turn on a light-emitting diode (LED), or other suitable visual indicator. As soon as the pulse high extends beyond $t_1$, the LED is turned on and it remains on until time $t_2$. The transponder can receive different command signals as different high level pulses in the group are "stretched" to various lengths. Those skilled in the art will appreciate that the controller may vary the duration of the S1 closure, and thus the duration of the high level pulses (such as the pulse between $t_0$ and $t_2$), thereby encoding information in addition to that shown in the illustrated embodiment, and thus the flexibility of the system is substantial. It is important to note that after the wait period, the appropriate component (LED), relay or other unit) is energized while the pulse is still high. This means the energy for the component is supplied rrom the controller over lines 27, 28, rather than being supplied by the transponder. This will be explained more fully hereinafter. In a similar manner the transponder returns information by closing its switch S2 and thus providing a data return signal at amplitude V/3, analogous to an extended closure of switch S2 in FIG. 3. This will be explained in more detail in connection with FIGS. 6A, 6B, and 6C.

DETAILED DESCRIPTION OF THE INVENTION

Figure 6B:
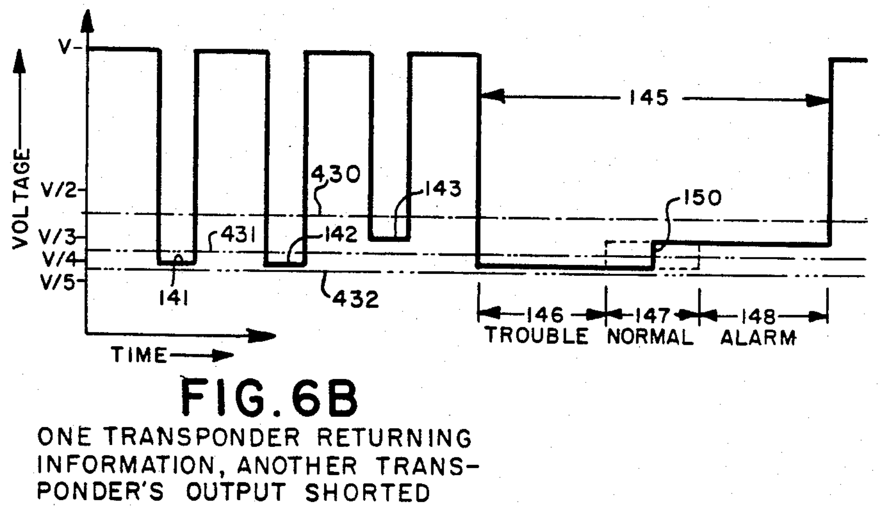
Figure 6C:
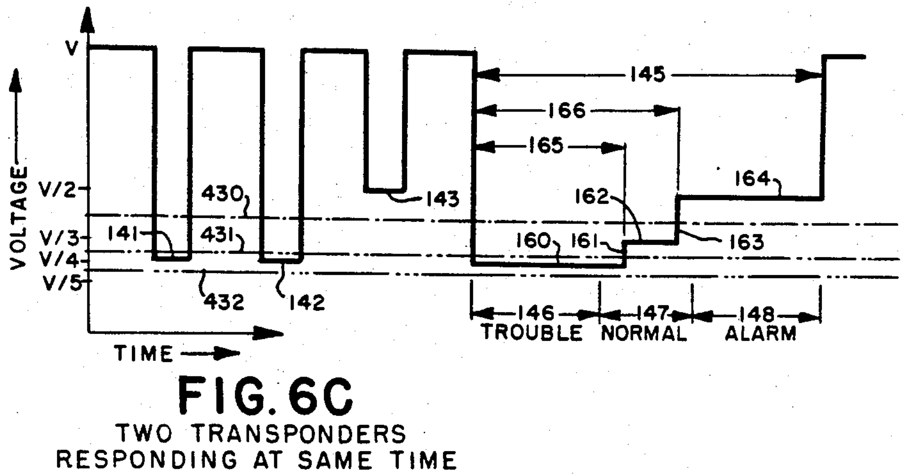

FIGS. 6A, 6B and 6C are helpful to understand the transmission of data from any of the transponders 25 to the controller 26. This is accomplished with the switch S1 of the controller in the open position, and switch S2 in the transponder is selectively closed to transmit the data. With each closure of switch S2, the voltage on sense line 41 of the controller goes to V/3. The length of time that the voltage on conductor 41 remains at V/3 is a function of the controller (time duration of S1 open), and also the transponder (time duration of S2 closure). The S2 closure time in turn depends upon some characteristic (such as voltage amplitude) of a detector or any other transducer associated with the transponder, or of information generated within the transponder circuit. Such associated detector (or transducer), or internal information generation, will be explained hereinafter.

FIG. 6A depicts one of the pulse groups, such as those in FIG. 4 under the legends "transponder 1" and "transponder 2", taken on a scale enlarged relative to that of FIG. 4. In FIG. 6A the four pulses have "lows", or the low-amplitude portion of each pulse, designated 141, 142, 143 and 144. The fourth low 144 occurs in the time duration referenced 145, and, in this embodiment, this duration is itself subdivided into three "windows" or time intervals 146, 147 and 148. It is manifest that any desired number of windows or time intervals can be provided, depending on the degree of accuracy required. There is a transition 150 in the fourth low, which as shown occurs in the center of window 147. This transition is within the "normal" window 147, and indicates "normal" operation of the component under discussion (whether an associated transducer or a component internal to the transponder) providing the information for return in the interval 145. By way of example, this could signal the normal condition of an associated detector, or the open condition of an associated switch. If the transition occurred in the initial part of the interval 145, within time window 146, this is a low-voltage indication and could be used to indicate a trouble condition of an associated detector, or that a switch is not connected. If the transition occur within window 148, toward the end of time duration 145, this could be a signal, by way of example, that the associated detector is in an alarm condition, or an associated switch is in the closed position. It is emphasized that the time duration of the initial portion of the pulse low, before the transition, is made to represent the voltage amplitude at the transponder. Of course, this time duration could be made a function of other parameters, such as frequency or current level. In addition, transducers other than smoke detectors or switches can provide condition-indicating responses within time frame 145. For example, if a temperature-indicating transducer were connected to the transponder, a transition within window 146 could indicate a low temperature, a transition within time interval 147 could signal a medium or normal temperature, and a transition within window 148 could mean a high temperature. While the transition 150 has been emphasized in the general description of FIG. 6A, it will become apparent that the time measuring scheme of the invention does not look for the transition, as such. Rather the system continually examines, at predetermined intervals such as one millisecond, the level of the voltage during interval 145, and accumulates a count related to the time that the signal is at V/3 during time interval 145. This provides a substantial improvement in noise immunity and measurement accuracy, as will be explained below. With the simple system and response indications shown in FIG. 6A, those skilled in tne art will appreciate the many modifications that can be made in this flexible system.

The interval 145 was "stretched" or elongated by S1 remaining open to provide an adequate time duration for signifying the amplitude of a related analog voltage level. Of course, any of the other pulse lows 141, 142 or 143 could have been elongated to send back information, but if elongated, the data transmitted would have been different. In the illustrated embodiment, stretching or elongating the first pulse 141 permits the transponder to transmit its calibration information in its entirety, based on a reference voltage. Stretching of the second low 142 permits the transponder to provide information identifying the transducer or other component associated with the transponder. Stretching either of the lows 143 or 144 permits the transponder to return information concerning an analog signal supplied to the transducer. In the example, only one pulse low was stretched, but more than one pulse low can be elongated in a single return. Alternatively, no pulse low will be stretched if no information is desired to be returned. Thus there can be 0, 1, 2, 3, or 4 pulse lows stretched in any single group of pulses, in the embodiment where 4 pulses are used for one transponder address.

Because the first two pulse lows 141, 142 extend below line 430 but short of line 431, the controller is able to determine (by examining the voltage level on sense conductor 41) that the transponder switch S2 was closed. The switch closure establishes the voltage level V/3 on the sense conductor 41, and that level is within the amplitude range defined between lines 430 and 431. At the time the third pulse 143 would be transmitted from the transponder, with no associated transducer or a zero signal level at that transponder, its switcn S2 is not closed. At this time the voltage on the sense conductor is V/2, determined by R1 and R2, and represented by low 143 in FIG. 6A. This response at level V/2 does provide information, namely there are no S2 closures—in the addressed transponder or in any other transponder—at this time.

If an ionization type smoke detector were connected to the responding transponder, the "stretched" pulse low in time interval 145 can convey information as follows. The entire time interval might have a duration of 32 milliseconds (ms), to denote a voltage amplitude range of 0 to 8 volts. Thus each millisecond of pulse duration represents 0.25 volt. In this embodiment the first or trouble window extends 12 ms, representing 3 volts; normal window 147 is of 8 ms duration, denoting 2 volts; and the third, or alarm, window lasts for 12 ms, indicating 3 volts. Thus with the transition 150 occuring as shown, the transponder is "telling" the controller that a voltage level of 4.0 volts has been connected to the appropriate input of the transponder from the associated transducer, in this case an ionization-type smoke detector. The controller then operates upon this voltage level to determine how far this voltage (4.0 volts) is from a reference level for that specific transducer to determine the state of that transducer. In addition this measured voltage level may be compared with a previously recorded voltage level from the same transducer. When the previous voltage level was recorded prior to a relatively long time period, say a week or more, the comparison can provide an indication of gradual changes in the detector operation, which might be caused by component aging or dust accumulation. By noting the extent of the change in detector operation, the change can be compensated in the system and thus avoid an erroneous indication of alarm or other condition. In addition the extent of the change caused by dust or aging can be utilized to indicate that maintenance is needed (cleaning and/or other repair of the system), to avoid an unwanted alarm or trouble condition. By compensating for the long term changes in the detector voltage, the controller is continually able to determine the true sensitivity, or "distance" from alarm, of each detector. This is an important advantage over the earlier described system, and over prior art systems.

In this embodiment only three windows or measuring intervals are used, to simplify the explanation. If the transition 150 had occurred in the window 146, this is in the time range of 0 to 12 ms and represents a voltage amplitude of 0 to 3 volts at the detector. A transition in this range signifies there is some trouble condition, such as an open circuit at the connected transducer, or a circuit malfunction in the transducer. If the transition occurs in the third window 148, this signifies a voltage in the range of 5 to 8 volts within the time duration of from 20 to 32 milliseconds. A transition occurring during this time frame indicates the connected transducer is in the alarmed state, when this signal is processed at the controller. That is, the controller compares the returned signal to the previously stored alarm threshold reference level, and when it determines the return signal is above this level, the alarm condition is indicated by the controller. It is thus apparent that a timing arrangement is necessary in the controller to identify the particular duration of the signal being returned over sense conductor 41, and this will be explained in connection with FIG. 13. For the present it is sufficient to note that the timing is measured in the controller, and thus neither the transponder nor its associated transducer can initiate an alarm. In this embodiment the controller determines and indicates when an alarm or trouble condition is present at a specific transponder.

FIG. 6A indicates the response when a single transponder is closing its switch S2, but in FIG. 6B the response shown occurs when another transponder (that is, a transponder which has not been addressed) has its switch S2 failed in a shorted position. That is, S2 of the other transponder remains closed throughout the time period in which information is returned by the addressed transponder. The ability to "read through" this short is an important advantage of the present invention. In FIG. 6A the negative-going excursions of the first two pulses were between the lines 430 and 431. These lines are similarly referenced in FIG. 6B. Line 430 represents a voltage level intermediate the V/2 and V/3 levels, and reference line 431 represents a voltage level intermediate the V/3 and V/4 levels. Line 432 denotes a voltage level between the V/4 and V/5 amplitudes. With S2 of one transponder closed, the resistor R3 of that transponder is in parallel with R2 of the controller, providing a voltage level of V/3 on sense conductor 41 as has already been explained. This is evident from the negative-going excursions of the first, second and fourth pulses shown in FIG. 6A. However, with an additional transponder having its switch S2 failed in the shorted position, an additional R3 is paralleled with the other resistors, and this produces a negative-going excursion of the first, second and fourth pulses to the V/4 level as shown in FIG. 6B. It is apparent from inspection of the signal pattern in FIG. 6B that the information can still be received from the transponder and utilized, notwithstanding the shorted output condition of the additional transponder. Examination of the signal being returned is readily effected by measuring the time duration during which the pulse amplitude remains at V/4, from the beginning of interval 145 to the transition 150. The method of measuring this time duration will be explained in connection with FIG. 11. By measuring this time interval the controller is able to read "through" the short and still determine the information being provided by the responding transducer. This ability to read through (and also write through) a transponder's shorted output is not present in the prior systems and is an important advantage of the present invention. Sequential systems are usually dependent upon proper operation of previously addressed transponders or a subsequently addressed transponder to return accurate information. In some systems such improper operation prevents the return of any information from subsequently addressed transponders. Digital systems are usually dependent upon proper operation of all transponders. If any one transponder has its output element shorted, no useful information can be received. If two or more transponders are sending information simultaneously, again no discernible information can be received.

FIG. 6C illustrates a different type of response, where an additional transponder is not shorted but is nevertheless returning information concomitantly with the addressed transponder. Again the first two pulses reach the V/4 level, in that S2 of both transponders are closed at the same time. However, neither S2 is closed during the third pulse interval, and hence the controller is able to determine there is not a short at the second transponder, but instead both are providing information simultaneously. During the stretched pulse interval 145, the initial portion 160 of the pulse is at the V/4 level. However, there is a first transition 161, followed by a portion 162 at the V/3 level, and a second transition 163 before the pulse returns to the V/2 level in the final portion 164 of this pulse. If both transitions 161, 163 are within normal window 147, as shown, the controller "knows" there is no alarm condition. Should one response fall in the alarm region, the controller "knows" that one detector is at the alarm level, but at this time cannot identify the precise detector returning the alarm-level signal. Time interval 165 represents the lower analog voltage value of the two being returned, and time period 166 represents the higher of the two values. Had period 166 extended into alarm window 148, the controller would have determined that one of the two answering transponders was returning an alarm-level signal.

Figure 7:
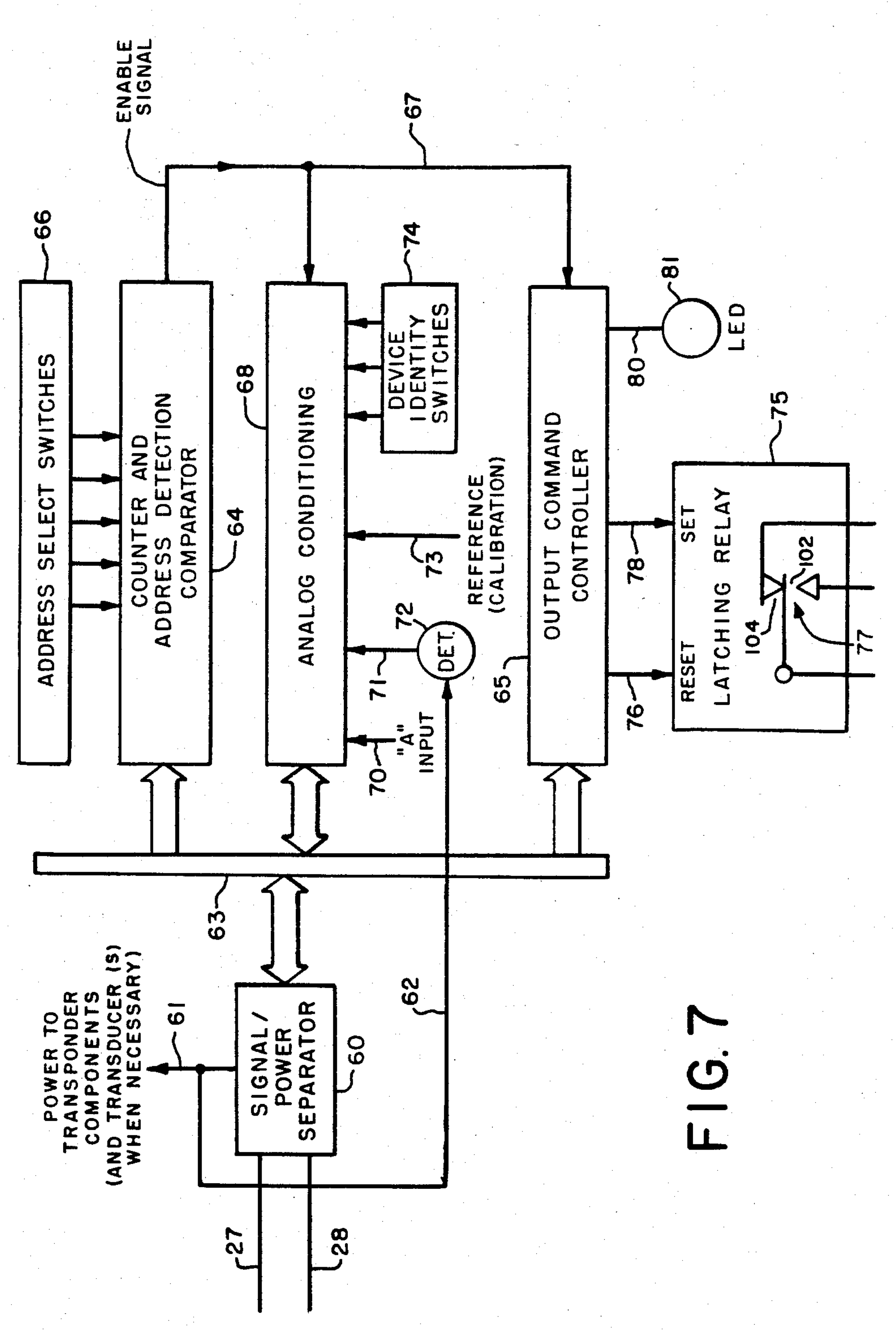
FIG. 7 is a functional block diagram of a transponder in accordance with the earlier system and useful with this invention.

FIG. 7 depicts the functional arrangement by which received signals issued by the controller are processed with any transponder. As there shown signals received over the line conductors 27, 28 enter the signal/power separator 60, which effectively passes a d-c energizing potential difference for the transponder components over line 61 to the individual ones of those components, and over line 62 to associated components (such as a detector) when required. Those skilled in the art will appreciate that the line 61 may represent several conductors, such as a ground conductor, a conductor with 5 volts with respect to ground, another with 12 volts with respect to ground, and so forth. Signals received from the line conductors are passed from the separator 60 to common bus 63, which in turn passes the signals to an address detection circuit 64 and an output command controller 65. A plurality of address select switches represented by block 66 are individually coupled to address detection circuit 64. The switches are simple on-off switches, each of which can be set in the open or closed position to collectively determine the address of the specific transponder in which the circuit is located. With five switches in the illustrated embodiment, up to 32 addresses can be individually assigned by opening and closing different ones of the switches. Thus these switches represent circuit means for determining the unique address of the transponder in which the switches are located. A comparator or other arrangement within detection circuit 64 recognizes coincidence of the address received over bus 63 from the line conductors with the unique address set by switches 66 and, upon recognizing this coincidence, provides an enable signal over line 67 to both the analog conditioning circuit 68 and the output command controller 65.

The analog conditioning circuit 68 includes means for recognizing when command information has been received from the controller, and makes the appropriate circuit connections required by such command information. Analog conditioning circuit 68 also receives a first analog signal over conductor 70, which in this embodiment is zero volts, and a second analog signal over conductor 71. The received analog signal can be any type of information-connoting signal. By way of example, a detector 72 is shown coupled over conductor 71 to analog conditioning circuit 68. When the circuit is directed to return information to the controller concerning the analog signal received over line 71, the analog conditioning circuit transmits the response information signal, generated as a function of the analog signal received over conductor 71, over bus 63 and the signal/power separator 60 to the line conductors, and thence to the controller. In this way the sensitivity level of the particular detector can be monitored in every cycle of operation if that is desirable or necessary under given conditions. A reference or calibration voltage is provided over line 73 to the analog conditioning circuit 68. This reference voltage can be derived from a Zener diode (not shown) or other suitable unit. The reference or calibration voltage is returned to the controller when requested, so that the controller circuitry can evaluate the operating condition of the transponder. For purposes of this explanation, and the appended claims, line 73 represents means for providing a reference voltage.

A plurality of device identity switches 74 are also shown coupled to analog conditioning circuit 68. Like the other switches 66 identity switches 74 are simple open-closed or on-off switches, but can be any suitable means for completing a circuit to the most negative or most positive power rails. Such switches can be set to provide a numerical combination (from 1 through 8, in this embodiment) to identify the transducer type (such as detector 72) responding over the line conductors. By way of example, the setting of these switches can identify the type of connected transducer as an ionization-type smoke detector, a photoelectric-type smoke detector, an instrument signifying air velocity, a temperature-indicating unit, a mechanical switch such as those used with manual pull stations (toggle type), a momentary switch of the type used to dump Halon, or some other device. The analog conditioning circuit also passes the signal indicating a particular command has been recognized over bus 63 to output command controller 65, which is also enabled at this time over line 67. This controller can accomplish various functions. For example, one signal can regulate an electromechanical actuator 75, shown as a set-reset or on-off latching relay, to reset. A signal over line 76 can order this operation and the illustrated contacts 77 will be displaced from the position shown to the alternate position (reset). A signal from output command controller 65 passed over conductor 78 can displace the contact set to the illustrated (set) condition. Another possibility is to pass an output command signal over line 80 to illuminate a signal lamp 81, such as a light-emitting diode (LED).

Figure 8:
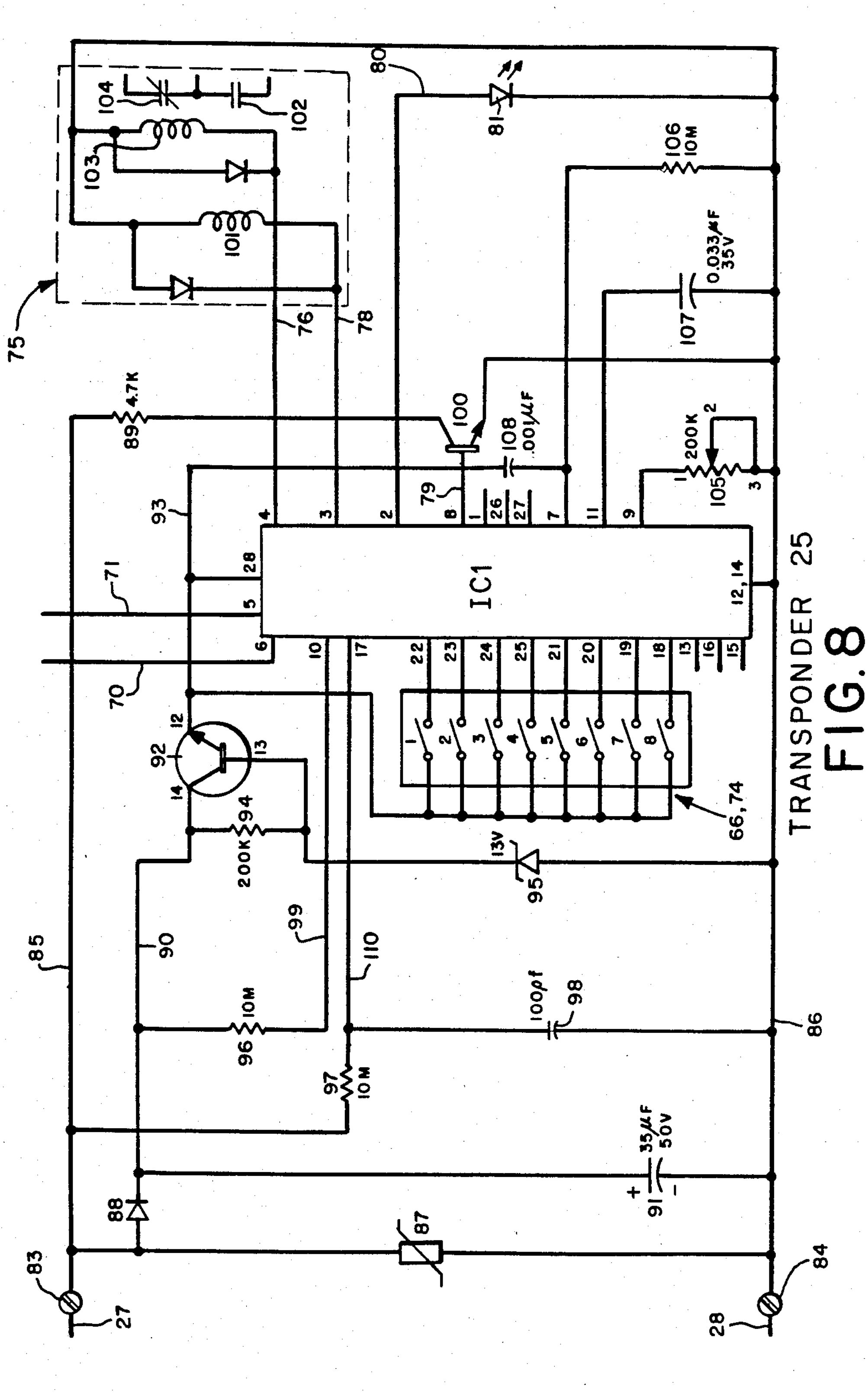
FIG. 8 is a schematic diagram of a transponder used in the earlier system, and with the present invention.

A basic schematic of a transponder suitable for operation with the present invention is shown in FIG. 8. A pair of screw-type terminals 83, 84 connect the line conductors 27, 28 to conductors 85, 86 of the transponder. A surge protector 87 is coupled between conductors 85, 86 to protect the transponder components from transients on the line. A diode 88 is coupled between signal line 85 and power line 90 of the transponder. A capacitor 91 has one side coupled to conductor 86 and its other plate coupled to the common connection between power conductor 90 and the cathode of diode 88. When a long positive-going pulse is received at the transponder, current flows through diode 88 to charge capacitor 91. The charge on capacitor 91 maintains the voltage on power conductor 90 during normal operation, when the lines are low, that is, when the voltage across conductors 27, 28 is at V/2 or lower. This voltage on conductor 90 is applied to the collector of an NPN type transistor 92, which is connected as a series regulator to provide a regulated output voltage on conductor 93. A resistor 94 is connected between the collector and the base of transistor 92, and the base is also coupled through a Zener diode 95 to conductor 86. A resistor 96 is coupled between conductor 90 and, over line 99, to input connection 10 of integrated circuit 1 (IC1).

When the voltage level on line conductors 27, 28 changes, there is a corresponding change in the amplitude of the signals passed to pin 17 of IC1. A low-pass filter, comprised of resistor 97 and capacitor 98, effectively blocks out high-frequency noise pulses. In order for IC1 to receive a low-going pulse at pin 17, the signal level on conductor 27 must go low (to V/2) for at least one-half millisecond before the low-going pulse is recognized as a clock signal to IC1. The voltage level on conductor 110 is compared against the voltage level on conductor 99, which is derived from the line voltage (across conductors 27, 28) is used as a reference signal to determine whether the clock signal is high or low. Utilization of this reference signal compensates for large variations in the line voltage. In the embodiment disclosed, the system was found to function accurately despite line voltage variations from 15 to 30 volts, a 2:1 voltage change.

Other input signals are provided to IC1 from the arrays of on-off switches 66 and 74 shown to the left of IC1. The first array includes switches 1–5 which are the address select switches 66. These are set (by selective opening and closing before the equipment is energized) to determine the unique address of each transponder. The second array includes switches 6–8, which are the device identity switches 74. These are set according to the particular components (not shown) which are coupled individually to the conductors 70 and 71 (FIG. 7) to provide the A and B analog input signals to the integrated circuit.

When an output command is issued by the transponder circuitry, the appropriate signal is passed over one of the conductors 76, 78 or 80 in FIG. 8. An output signal passed over line 80 energizes LED 81, coupled to conductor 86. An output signal on line 78 is effective to energize the "set" winding 101 of latching relay 75 and to close the normally-open contact set 102 of this relay. An output signal over conductor 76 energizes the reset winding 103 of the relay to close the normally-closed contact set 104 of the relay. When the transponder output circuitry provides a signal at pin connection 8, over line 79 to gate on NPN type transistor 100, resistor 89 which in this embodiment is a 4.7K resistor, is effectively connected between conductors 85, 86, to pull down the amplitude of the voltage then being presented to the controller. Thus the operation of transistor 100 in response to the transistor control signals on line 79 is analogous to the opening and closing of switch S2 as shown in FIG. 3 and explained earlier in connection with the transponder operation. It is apparent that resistor 89 (FIG. 8) thus corresponds to the resistor designated R3 in the earlier discussions of the general system operation.

It is important to emphasize that an output command signal on line 79 to gate on transistor 100 is only provided during a low portion of any signal pulse. However the other actuating signals, to set or reset relay 75 or illuminate LED 81, are provided only during the high portion of a pulse; this is important because the transponder utilizes energy provided from the controller on lines 27, 28 to actuate these components, without imposing any drain on the energy stored in capacitor 91 which energizes the components illustrated in FIG. 8. Other components such as variable resistor 105, fixed resistor 106, and the capacitors 107, 108 are useful in connection with the circuitry of IC1.

Figure 9:
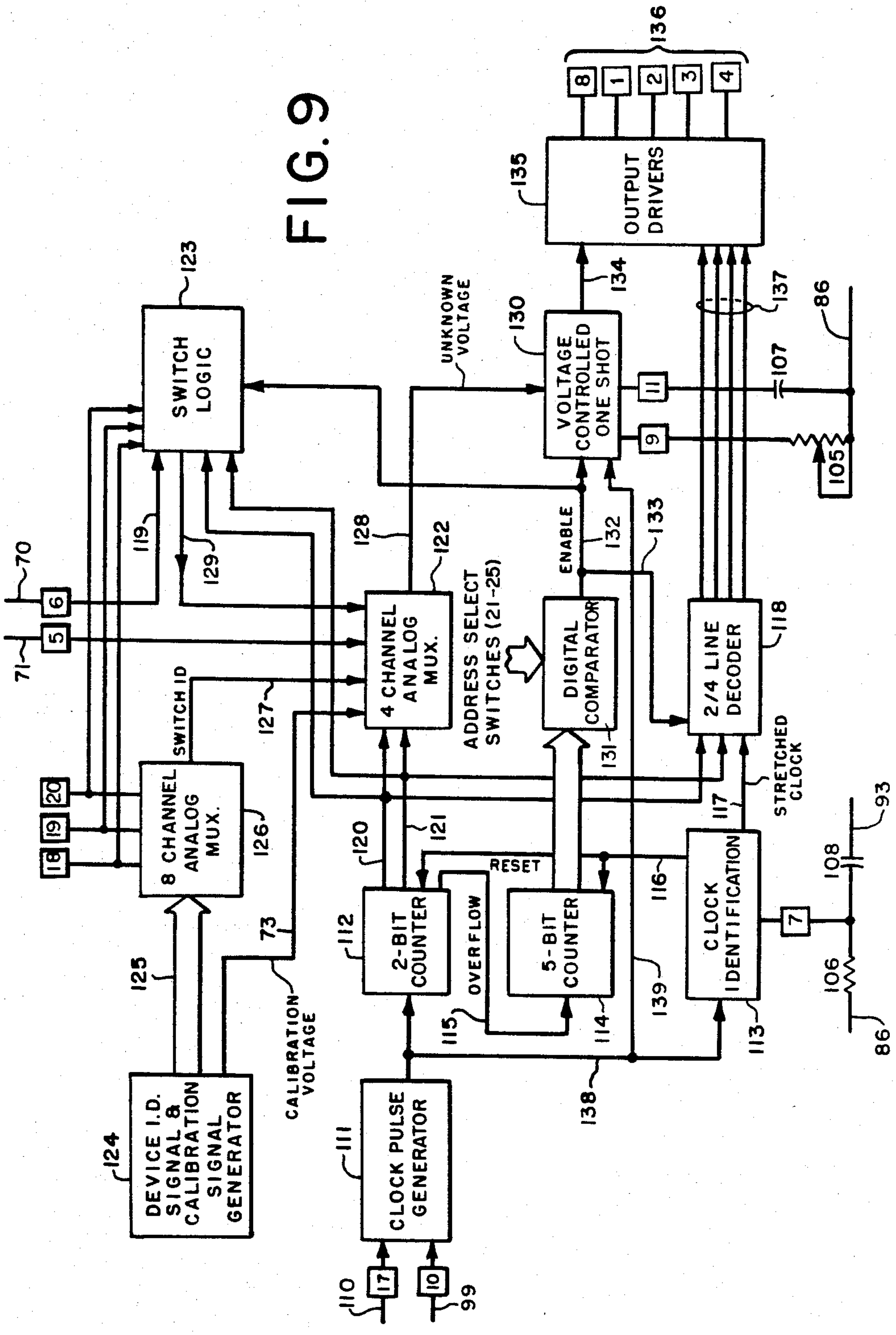
FIG. 9 is a functional block diagram of an integrated circuit useful in the transponder shown in FIG. 8.

A general block layout of the integrated circuit is shown in FIG. 9, and a functional description of the circuitry follows. The signal pulses in each group received at the transponder are passed over line 110 to input pin 17 of IC1, and thence to clock pulse generator stage 111. This stage includes conventional pulse shaping circuitry, such as a comparator which compares the signal voltage level on line 110 against the reference voltage level on line 99. The clock pulse generator provides its output to a 2-bit counter 112 and a clock identification circuit 113. The clock identification circuit also receives a reference oscillator signal from resistor 106, capacitor 108, and conductor 93, also shown in FIG. 8. A 5-bit counter 114 (FIG. 9) is connected to receive overflow pulses over line 115 from the 2-bit counter 112. When the incoming pulse remains high beyond a preset time (20 ms in the described embodiment), a "stretched clock" identification pulse is passed over line 117 to a 2-to-4 line decoder circuit 118. When the incoming pulse remains high for a duration of 80 ms (in this embodiment), stage 113 provides a reset pulse over line 116 to both counters 112 and 114.

The 2-bit counter 112 provides a "clock decode" output signal on its output conductors 120, 121. Basically this signal identifies which of the several possible commands is to be executed by the transponder. This signal on lines 120, 121 is passed to 2-to-4 line decoder 118, the 4-channel analog multiplexer 122, and a switch logic circuit 123. The switch logic circuit is operative to provide external switch operation "memory" for two polling cycles of this transponder, should the external switch be operated for a duration less than two polling cycles. In this embodiment a polling cycle—the time interval between two successive enable pulses being provided at the output of stage 131—is three seconds. Thus the memory duration for switch logic circuit 123 is from 3 to 6 seconds, depending on the exact time in the polling cycle the external switch is operated. Such an external switch can be a momentary, mechanical switch providing a signal over line 70 and pin connection 6 to the switch logic circuit. It is emphasized that notwithstanding the presence of this switch and its actuation, the switch logic circuit does not store the actuation indication for subsequent transmission to the 4-channel analog multiplexer 122, unless the appropriate switch identification information is received over the three lines connected to pin connections 18, 19 and 20. These pin connections are connected to the device identity (ID) switches 74, as already explained. If the device ID switches 74 are in the appropriate combination to enable switch logic circuit 123, then this stage 123 is conditioned to pass the information regarding the switch actuation (at line 70) to the 4-channel analog multiplexer 122.

In the system of this invention, certain combinations of the device ID switches coupled to pin connections 18, 19 and 20 are effective to turn the switch logic stage 123 on, that is, to open the circuit between conductors 119 and 129 to the 4 channel analog multiplexer 122. In the preferred embodiment 2 of the 8 possible switch combinations were used to provide this operation. Under this condition, the switch logic circuit 123 receives the signal over line 70, pin 6, and line 119, and operates upon this signal to provide a specific state voltage which is passed over line 129 to multiplexer 122. In the other 6 combinations of the switches coupled to pins 18, 19 and 20, switch logic stage 123 effects a straight-through coupling between lines 119 and 129.

Operation of the switch logic circuit will be better understood with reference to FIG. 6A. When the device ID signal denotes a two-position switch coupled to line 70, the information received over line 119 from the switch must be "translated" or converted to identify one of the 3 possible states, either not connected, open or closed. Alternatively, a temperature sensor device coupled to line 70 would produce an analog output signal, and the device ID signal would dictate a straight pass-through of this information, without conversion in switch logic stage 123.

A generator circuit 124 is provided to develop the device identification (ID) signal and calibration (reference) signal. The ID signals are applied over a plurality of conductors represented by bus 125 to an 8-channel analog multiplexer 126. The switch ID output signal from multiplexer 126 is passed over line 127 to the 4-channel analog multiplexer 122, which also receives the calibration voltage signal over line 73 from generator 124. Multiplexer 122 also receives the analog A signal over conductor 71, and the analog B signal received over line 70, via lines 119 and 129, when the circuit is completed by switch logic stage 123. The output of multiplexer 122 is passed over line 128 to a voltage-controlled one-shot stage 130, which has connections as shown to the variable resistor 105 and capacitor 107 in the lower right portion of FIG. 8.

A digital comparator circuit 131 (FIG. 9) is connected to receive the outputs from 5-bit counter 114, and the inputs from the address select switches 66. Upon recognition of coincidence between the unique transponder address determined by these switches and the address represented by the pulses transferred from counter 114, digital comparator 131 passes an enable signal over line 132 to the voltage-controlled one-shot 130, and the enable signal is also passed over line 133 to the 2-to-4 line decoder 118. The output of the clock pulse generator on line 139, when high, resets voltage-controlled one-shot 130. When this clock output signal is low, this provides a second enable signal to stage 130. The voltage-controlled one-shot stage 130, upon receipt of both enable signals, functions to provide an "energize" output signal on line 134 which is amplified in the appropriate one of the output drivers 135, and passed over the output pin connection 8 of IC1. Pin 8 is selected whenever the transponder is sending information back to the controller. This is analogous to gating of transistor 100 in FIG. 8, or closure of switch S2 as explained above in connection with FIG. 3.

To select any of the other output pin connections 136 (1, 2, 3 or 4), the 2/4 line decoder 118 must provide an appropriate output signal on one of its four output lines 137. This requires three signals to decoder 118: (1) clock decode output on lines 120, 121 which selects the output driver to be energized; (2) enable signal on line 133, corresponding to a "transponder select" signal; and (3) another enable signal ("stretched clock") on line 117, which signifies the command has indeed been issued. Selection of pin 1 may be used to energize an associated alarm apparatus, but pin 1 is not used at this time. Selection of pin 2 indicates that LED 81 is to be energized. Selection of pin 3 is equivalent to providing a signal on conductor 78 (FIG. 7) to set the latching relay, and selection of pin 4 is equivalent to providing a signal on conductor 76 to reset the latching relay.

The foregoing functional description is sufficient not only to enable one skilled in the art to provide an appropriate specific circuit design for IC1 in FIG. 8, but by explaining the entire functional sequence, it further enables one skilled in the art to implement the circuit operations with various circuits, or to regulate different output functions as may be desired. Now that the operation and circuit arrangement of the transponder has been set forth, it will be helpful to consider the manner in which controller 26 operates upon the information returned from the transponder to derive and utilize useful signals and provide appropriate indications.

Figures 10, 11, 12:
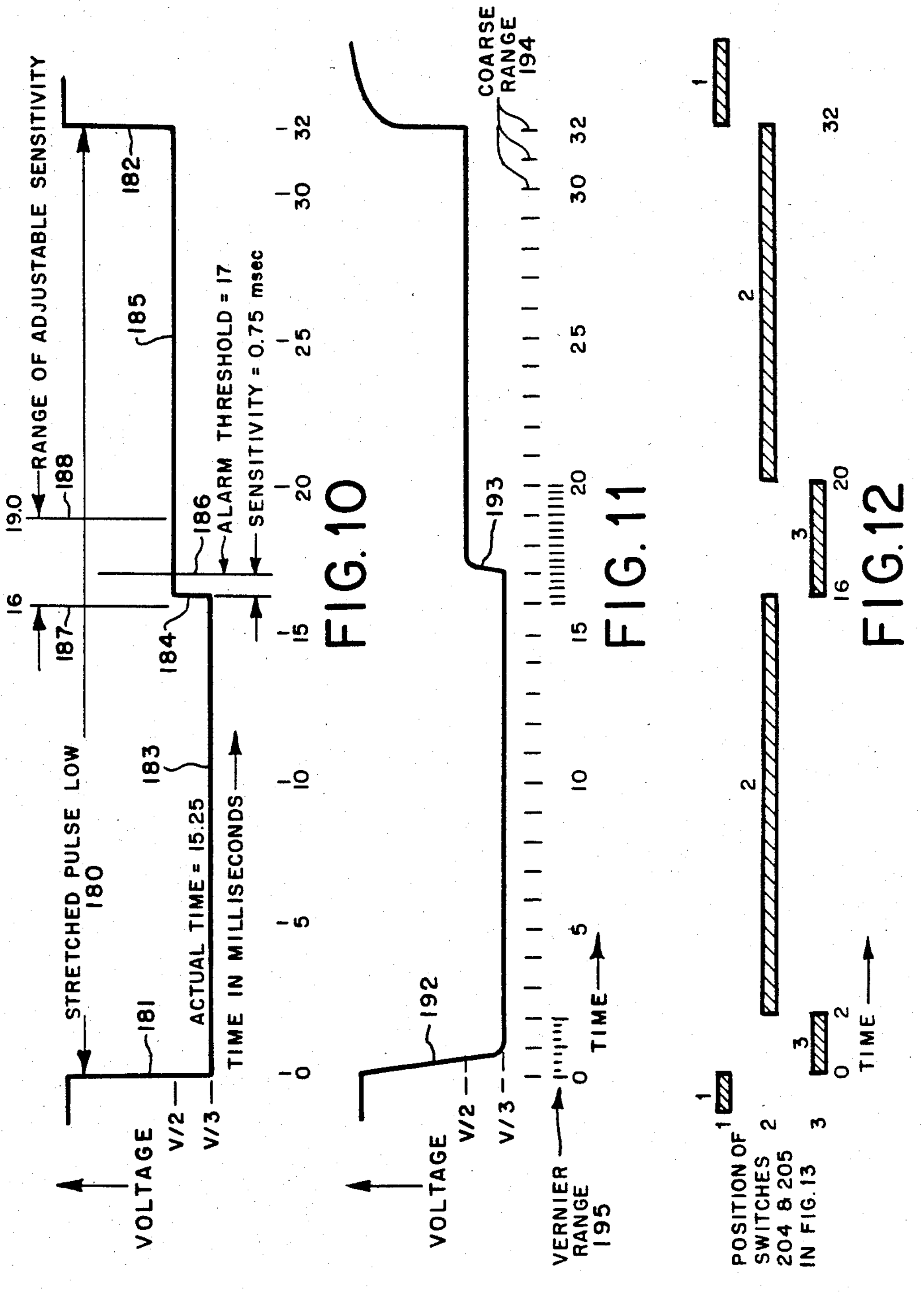
FIGS. 10, 11 and 12 are graphical illustrations useful in understanding how the present invention derives information contained in a parameter of a signal.

FIG. 10 shows in idealized form a return pulse, that is, a "stretched" pulse low similar to that designated 144 in FIG. 6A. The pulse low in FIG. 10 is designated 180, and like the other pulses occurs during a time interval of 32 milliseconds (in this embodiment) from the leading edge 181 of the pulse to the trailing edge 182 of the pulse low. The stretched low 180 includes an initial low portion 183, a positive-going portion 184, where the signal goes from the V/3 to the V/2 level, and a final portion 185. Reference line 186 indicates the alarm threshold, and the lines 187, 188 depict the range of adjustable sensitivity.

As a practical matter, the actual sensitivity is represented by the difference between line 184 of the pulse signal and the alarm threshold line 186. In a preferred embodiment an 8 volt measurement range was depicted over 32 milliseconds, with the initial portion 183 of the pulse low representing the analog input value from the transponder to the controller. However, as a practical matter the returned information is not represented with an ideal waveform of the type depicted in FIG. 10.

Rather the various transitions are distorted by the components in the system, to produce transitions of the type generally represented in FIG. 11.

FIG. 11 shows a "real-life" pulse, produced with some line capacity effects. As there shown the initial edge 192 of the actual response does not descend vertically but follows a generally logarithmic curve. In this returned signal, the end of the analog or information period is represented at the positive-going portion 193, which likewise is curved rather than a sharp, vertical displacement. Because these are critical portions affecting the measurement of the V/3 level portion, it would be desirable to have some vernier or more precise measurement during these two transition periods. On the "coarse range" time scale 194 the units are separated by one millisecond (ms) intervals. It would be helpful to have another time scale, delineated as "vernier range" 195, where the units are separated in smaller intervals, such as one-half or one-quarter ms, to provide a more precise recognition of the pulse transitions and thus a more accurate derivation of the exact analog value represented by the low or zero level of the returned signal. Such a measurement, for this enhanced accuracy, is made on different time scales during different time periods as represented in FIG. 12.

As there shown, before any measurement starts the apparatus is at the 1 level or in the non-measuring mode. At time 0 (zero milliseconds) an appropriate measuring apparatus is switched in, operating on the vernier scale for the first 2 milliseconds of the return pulse, represented as the 3 level in FIG. 12. After the time of the initial transition, the measuring apparatus can operate at a more coarse level identified as level 2, until half the period or 16 milliseconds has expired. In this example the alarm threshold is "positioned" during the following 4 milliseconds, and hence the measuring apparatus is returned to the vernier or fine measurement mode for this time interval, from 16 to 20 milliseconds. For the remainder of the pulse return period, from 20 to 32 milliseconds, the apparatus can be returned to, and left in, the coarse measurement mode, and switched off at the expiration of the period. For other voltage ranges to be transmitted and different degrees of precision desired with the vernier measuring system, those skilled in the art will appreciate that changes in the voltage ranges and/or measurement intervals can readily be implemented.

Figure 13:
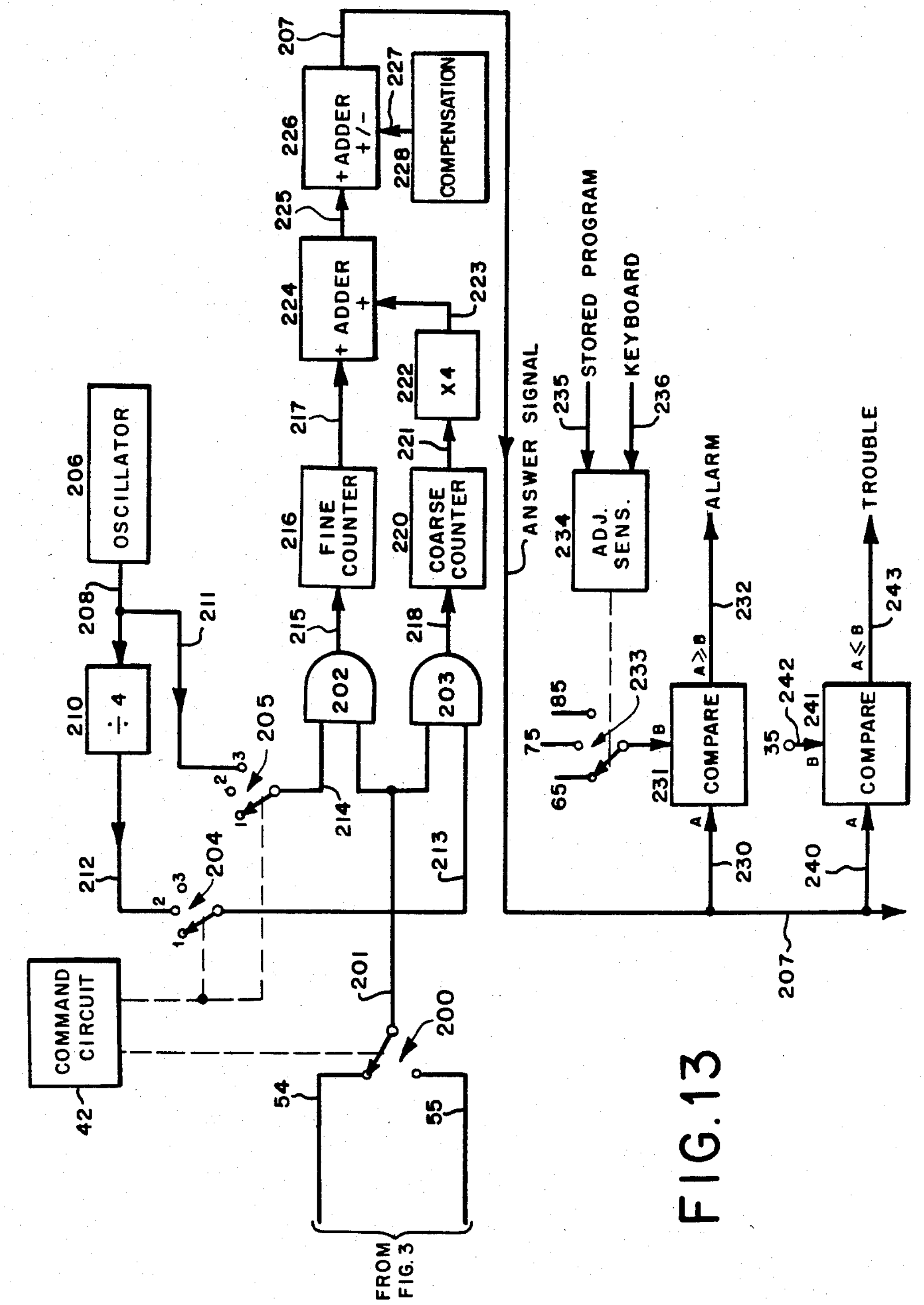
FIGS. 13, 14 and 15 are block diagrams of one system for implementing the present invention.

FIG. 13 depicts in simplified form the arrangement in controller 26 for operating upon the signal returned from the transponder and passed through comparators 51, 52 to provide useful information such as "alarm", "trouble", and so forth. Basically, the system receives the signal on line 54 when one transponder is responding with a V/3 level signal, and this signal is passed over switch 200 and line 201 to two AND circuits 202, 203. Command circuit 42 is connected to regulate operation of switch 200, as well as two additional three-position switches 204, 205. These latter switches are "ganged" or mechanically intercoupled for simultaneous actuation between the three positions illustrated. The circuit effects of the switching functions represented by switches 200, 204 and 205 are actually accomplished, in a preferred embodiment, under the control of an algorithm stored in the memory portion of the CPU used with the system. However, the mechanical switch illustration serves to depict the manner in which the signals and pulse trains are routed, tabulated and utilized to provide an appropriate "answer" signal from which significant, useful data are received from the appropriate transponders and/or intercoupled transducers.

Switches 204 and 205 have their switch contacts designated 1, 2 and 3 to indicate mechanical positions corresponding to the showings in FIG. 12 of the off (or non-measuring mode) 1, coarse measuring mode 2, and vernier or fine measuring mode 3. Basically the system provides a pulse train from an oscillator 206 (FIG. 13) over the switches 204, 205, for passage through the AND circuits so long as the signal on line 201 indicates the analog information is being returned from the transponder. The low level signal 183 shown in FIG. 10 is applied over line 54 to line 201 to gate the pulse train through one of the AND circuits to the then-effective counting system to provide an "answer" signal on line 207.

In more detail, oscillator 206 can be a conventional pulse generating unit operable, in the illustrated embodiment, to provide a pulse train at a frequency of 4,000 cycles per second. This frequency is chosen in relation to the duration of the returned analog signal and other considerations, including the degree of precision desired for operation in the vernier measuring mode. The oscillator signal is provided on line 208 directly to a divide-by-4 circuit 210 and over line 211 to position 3 (for fine counting of switch 205. The output of divide-by-4 circuit 210 is coupled over line 212 to position 2 of switch 204, the contact engaged during coarse counting. The movable contact of switch 204 is coupled over line 213 to one input of AND circuit 203, and the movable contact of switch 205 is coupled over line 214 to one connection of AND circuit 202. The output of AND circuit 202 is coupled over line 215 to a fine counter 216, which accumulates the total number of pulses received on line 215 and provides a signal on line 217 representing that total. Likewise the output of AND circuit 203 is coupled over line 218 to a coarse counter circuit 220, which accumulates the total number of received pulses and provides on its output line 221 a signal representing that total. This signal is passed to a multiply-by-4 stage 222, which multiples this resultant signal on line 221 by 4 and provides the net result on line 223. The signals on lines 217 and 223 are then combined in adder stage 224, providing a resultant signal on line 225. Those skilled in the art will appreciate that the counting, multiplication, division, and addition (or algebraic summation) of the various signals can be implemented with analog or digital techniques, but in this embodiment the arrangement has been implemented with a digital system. The output signal on line 225 is coupled to another adder stage 226, which also receives a compensation signal over line 227 from compensation stage 228. The precise compensation provided by stage 228 may vary as will be explained later. The output signal from stage 226, on line 207, is thus an answer signal representing the time duration during which the stretched low pulse 180 (FIG. 10) of the transponder response remained low, at the V/3 level.

Common line 207 (FIG. 13) provides the answer signal over line 230 to a first comparator 231, which includes an output line 232 for providing an alarm-indicating signal when warranted by the value of the answer signal and the setting of multiple position switch 233. As shown, this switch is displaceable to one of three (in this embodiment) settings by adjustable sensitivity stage 234, which can be controlled over line 235 from a program stored in the memory (not shown) of the digital system controlling the operations, or over line 236 from a keyboard or other terminal (not shown) interfacing with the system. The stored program can modify the position of switch 233, prior to comparing the answer signal, for each transponder connected in the system. This makes possible the assignment of any sensitivity setting to any detector on the system. Such control of switch 233 represents the function of adjustable sensitivity, as each detector can have its sensitivity adjusted from the control panel without taking the system out of operation. By changing the position of switch 233 to engage different contacts, where the number adjacent the contact denotes the value of the alarm threshold value, the answer signal on line 230 must equal or exceed this number represented by the setting to provide an alarm-indicating signal on output line 232. The numbers 65, 75 and 85 represent sensitivity thresholds on a scale of 0 to 128, a scale achieved by multiplying the 32 millisecond response interval by four. The reason for this will become apparent in the subsequent operational description.

The answer signal on line 207 is also applied over line 240 to another comparator stage 241, which receives another reference input signal over line 242. This comparator is connected so that when the answer signal on line 207 is less than or equal to the reference signal on line 242, a trouble-indicating signal is provided on output line 243.

In operation, it is initially understood that controller 26 has "told" an addressed transponder to return information, and thus command circuit 42 in FIG. 13, at the beginning of the response period, places switch 200 in the illustrated position. Switches 204, 205 are displaced to position 3, for fine counting. Thus, at this time oscillator 206 is passing signals over line 211, switch 205, and line 214 to one input of AND circuit 202. As soon as the fourth or stretched low commences, the other input to this AND is provided over line 201 from comparator 51, so that the pulse train is passed over line 215 and registered in counter 216. Suppose the leading edge 192 (FIG. 11) of the responding pulse reaches the V/3 level after 1.5 milliseconds, or 6 counts on time scale 195, then the remaining 2 pulses or counts are passed through AND circuit 202 (FIG. 13) to counter 216. This occurs because command circuit 42 maintains switches 204, 205 in position 3 for the first 2 milliseconds of the response period, after which the switch contacts are displaced to position 2 for coarse counting. Accordingly, the AND circuit 202 is effectively removed from the circuit, and AND circuit 203 is coupled over switch 204 to stage 210. Thus the train of pulses from oscillator 206 is divided down in stage 210, and applied over line 212, switch 204 and line 213 to AND circuit 203. The pulses are now effectively at 1,000 cycles, or one every millisecond, as represented on time scale 194 in FIG. 11. In that switches 204, 205 remain in position 2 during the interval from 2 milliseconds to 16 milliseconds, 14 pulses are passed over line 218 and accumulated in counter 220. This number is effectively multiplied in stage 222 to provide a value of 56 on line 223, which is added in stage 224 to the value (two) previously received over line 217. At this time (16 milliseconds) adder stage 224 registers a count of 58, and switches 204, 205 are returned to position 3 for fine counting.

Assuming that transition 193 (FIG. 11) occurs at 18 milliseconds, then 8 pulses are passed from the oscillator over switch 205 and AND stage 202 to register in fine counter 216, in the time interval between 16 and 18 ms, and this count is passed over line 217 for addition in stage 224. These 8 pulses are added to the previous total of 58, and thus the total in adder stage 224 is now 66. At time equal to 18 ms, the gating signal is no longer provided from line 54 to line 201. After 20 milliseconds (from time 0) the switches 204, 205 are restored to position 2 for coarse counting, but as noted there is no longer any gating signal present to gate the pulses through AND stage 203 to the coarse counter. At this time the signal on line 225 is passed to adder stage 226.

Compensation stage 228 can be used to modify the preliminary result at this time. For example, if the last interrogation of the particular transponder indicated a "reference" signal voltage had risen from 4.0 volts to 4.06 volts, due to aging of the system components or other long term system change, the result on line 225 could be modified by subtracting 1 from the count of 66 to provide a new count, 65, for comparison to the alarm threshold level and similar use in the other processing stages. Accordingly, it is assumed that a count of 65 is the answer signal on line 207 which is passed to the comparators 231, 241.

Comparator stage 231 is connected over switch 233 to a relatively low sensitivity level of 65, representing 65/128 of 8 volts, or about 4.06 volts. Because the signal on line 230 (a total of 65) is equal to the 65 reference signal on the other input of comparator 231, an alarm output signal is provided at this time. Operation of comparator 241 determines that 65 is greater than its reference input 35 (representing 2.19 volts), and thus no trouble signal is provided on line 243. Other processing stages will be described below in connection with FIG. 15. However, it is important to emphasize that the system illustrated in FIG. 13 provides a very high degree of precision in converting the analog signal on line 201 into the digital answer signal on line 207, even though the fine mode of counting is only employed for 2 milliseconds at the initiation of the response signal and 4 milliseconds near the middle of the response time. In a broader sense a vernier operation at a frequency higher than a reference frequency is utilized in a limited time span to provide accurate and effective measurement over a much longer time span.

Figure 14:
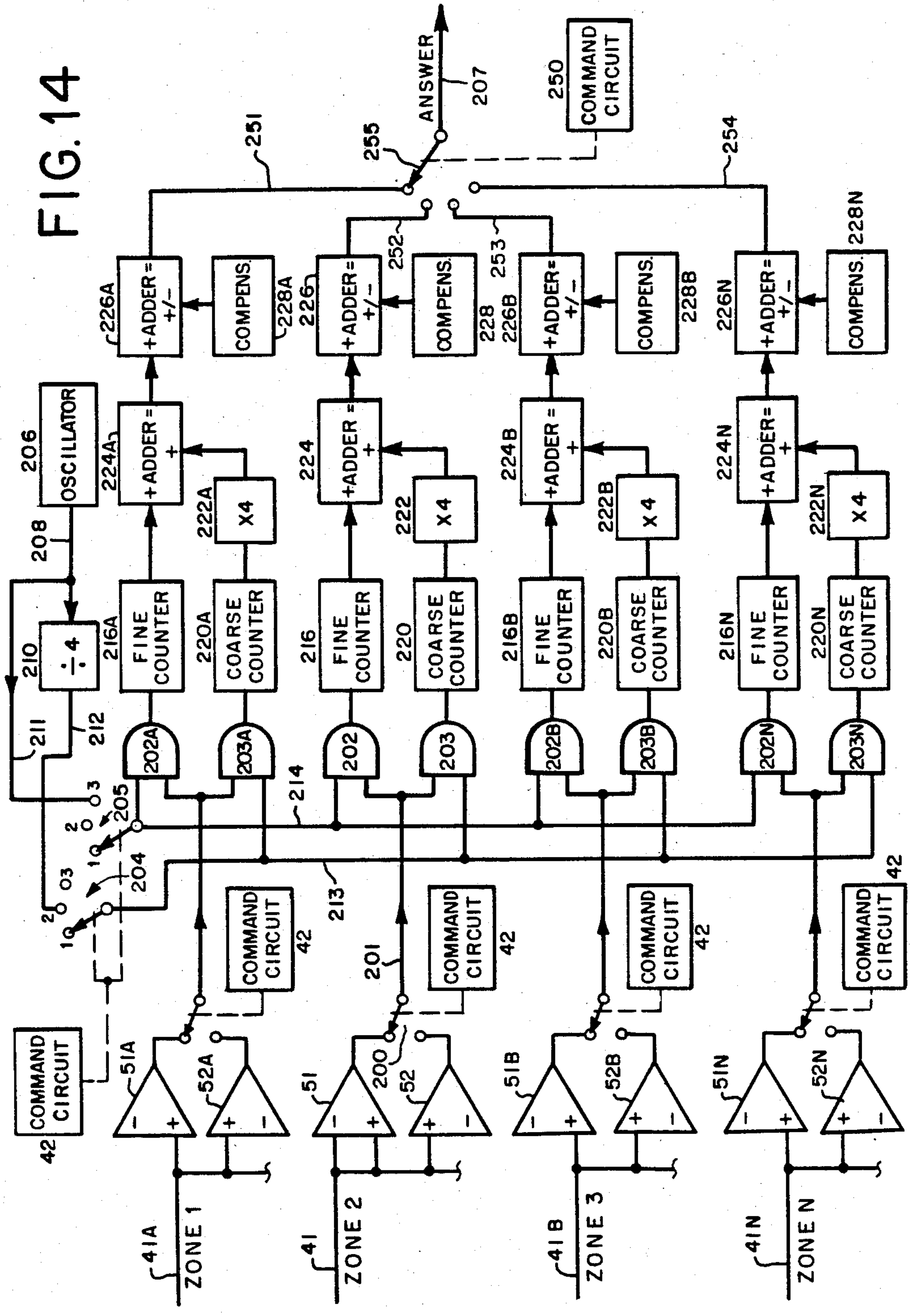
Figure 15:
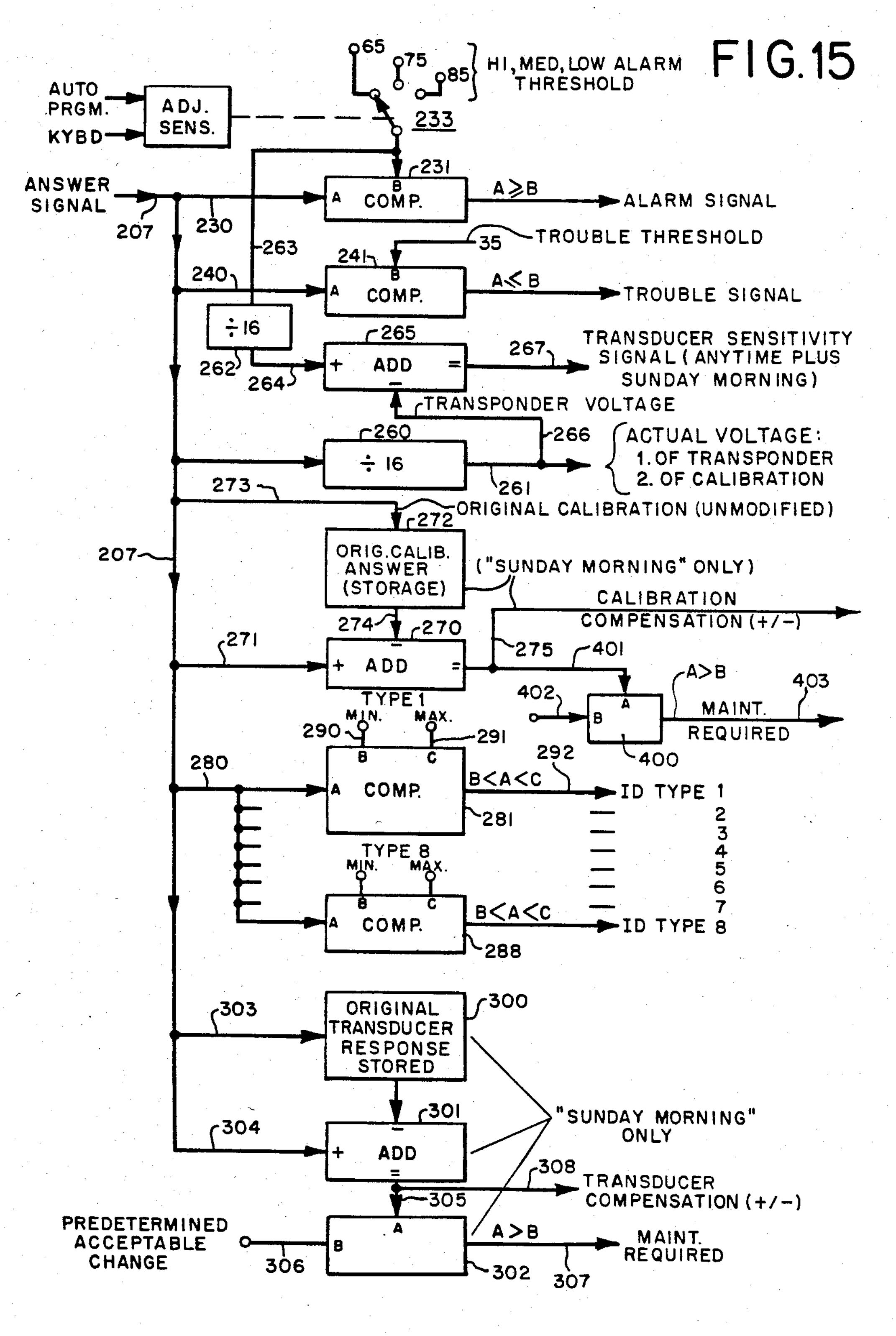

FIG. 14 shows a system for obtaining an "answer" signal on line 207, from one of a plurality of zones in which different transponders and transducers are located. Each zone provides an information-denoting signal over its respective conductor 41A, 41, 41B, or 41N. This is analogous to the showing of different conductor pairs in FIG. 17 under the regulation of a plurality of controllers 26. Thus the various switching functions shown in FIGS. 13, 14 and 15 are represented as regulated by a command circuit, that is, regulated by a CPU and associated program, and a plurality of controllers 26. The multiple zones depicted in FIG. 14 have their respective information signals analyzed and evaluated in the multiple channels shown in FIG. 14, and provide on their respective output conductors 251, 252, 253 and 254 different "answer" signals representing the respective zone conditions. Command circuit 250 then activates switch 255 for sequential connection to the various output conductors 251, 254, and provides only one "answer" signal on conductor 207 at any given time.

Those skilled in the art will appreciate that the routing of individual zone signals can be accomplished under the direction of the program stored in the controller or associated with the CPU (not shown), to provide an operation which is the functional equivalent of the switch arrangement shown in FIG. 14.

FIG. 15 illustrates an arrangement for operating upon the "answer" signal developed as explained in connection with FIGS. 13 and 14. Again the circuit illustration depicts the translation and/or manipulation of data to provide the desired functional output. Such manipulation can be under the control of the stored program, but the hardware illustration is useful to explain the underlying system arrangement and operation.

FIG. 15 shows the "answer" signal is distributed over bus 207 for presenting "answer" data to various operational stages. The processing of this data to obtain the "alarm" and "trouble" signals has already been described. As shown in FIG. 15, a divide-by-16 stage 260 is coupled to line 207. Since 128 counts represent a voltage amplitude of eight volts in this embodiment, then dividing 8 by 128 (as in divide-by-16 stage 260) establishes a ratio for converting the answer signal on line 207 into a signal (on line 261) representing the actual transponder voltage. Thus an answer signal value of 67 (for example) would be divided in stage 260 and produce an output value of 4.2, signifying 4.2 volts, on line 261. When a Zener diode or other device is used to produce a calibration voltage of 4.0 volts at a transducer, this results in an answer signal of 64 on line 207, which is divided by stage 260 to produce a calibration voltage value of 4.0 volts on line 261.

Another divide-by-16 stage 262 is coupled over line 263 to the movable contact of switch 233, which receives the selected alarm threshold voltage. Suppose switch 233 is positioned to the center or medium threshold setting, identified with a count of 75 in the drawing. This value is passed over line 263 and divided down in stage 262 to produce a value of approximately 4.7 volts on line 264, the input connection to summation stage 265. With a voltage of 4.2 volts passed over lines 261, 266 to the negative input of stage 265, this stage provides an algebraic summation of these values, subtracting 4.2 volts from 4.7 volts to provide a resultant value of 0.5 volt on output line 267. This resultant value is thus a measure of the transducer sensitivity, as it indicates how "far" the transducer is from the alarm threshold. If the voltage increases another 0.5 volt, the actual voltage will reach the alarm threshold and provide an alarm signal on line 232. By monitoring the long-term change of sensitivity value on line 267, the controller record can show changes due to component aging, dust accumulation, and similar effects. This sensitivity value on line 267 is a significant measurement and provides information at the controller which has not previously been obtainable.

Coupled to line 207 is another albegraic summation stage 270, which also receives the "answer" signal over its input line 271. A storage stage 272 is also coupled, over line 273, to bus 207. When the equipment is originally installed, the desired calibration signal is returned from each transducer, through its transponder. This initial calibration signal is stored in stage 272, providing a benchmark for subsequent reference. Thereafter in the "Sunday morning" poll, a measurement taken at a low-occupancy, quiescent time such as 2:00 a.m. Sunday morning, a calibration signal is returned over lines 207, 271 to stage 270. The original stored calibration signal is passed over line 274, and subtracted from the "Sunday morning" signal in stage 270. The resultant compensation signal on line 275 is a measure of the long-term changes in the circuitry, the electric conductors, and the other variables which affect the generation and transmission of the calibration voltage. Thus the signals on lines 275 and 308 or a portion thereof can be used to modify the data, for example, to raise/lower the answer signal as the compensation signals change, to help maintain the normal operating sensitivity of the system.

Stage 400 is coupled over line 401 to stage 270, to receive a signal denoting the extent of the change in the original calibration signal. A reference level signal is applied over line 402 to stage 400, and when the calibration variation signal exceeds the reference level, a "maintenance required" signal is provided on line 403.

The device ID signal is derived by passing the "answer" signal on line 207 over line 280 for examination by a series of comparators 281–288, only the first and last of which are depicted. The device identity switches 74 are represented generally in FIG. 7 and in more detail in FIG. 8. The switch settings are translated in multiplexer 126 (FIG. 9) into a switch ID signal on line 127, and then passed to the controller as has already been explained. Thus, the signal on line 280 (FIG. 15) is one of eight different values, with the precise value to be determined by the series of comparators 281–288. For example, a "type 1" signal may identify a smoke detector of the ionization type, and if the signal on line 280 is within the range predetermined by the input signals supplied over conductors 290, 291 to comparator 281, then an output signal is provided on conductor 292 to indicate the connected device is indeed a "type 1" unit. In this way the voltages established by the different combinations of the ID switch settings are effectively decoded and used at the controller to identify the particular device then returning information through its associated transponder.

Reference has been made to the "Sunday morning" service, a term used to indicate a sequential poll of the transponders and storage of the data returned, which poll is at a frequency substantially lower than the normal polling frequency, and is preferably taken at a time when the premises are virtually unoccupied and thus quiescent. At such a time the conditions in the controlled areas will have stabilized, and a sample poll taken at this time is useful to obtain reference information. For example, the response voltage of a transducer can be received, and then compared to the initial transducer response to determine if there has been any change in this response signal.

The three stages 300, 301 and 302 shown at the bottom of FIG. 15 are utilized only in the less-frequent poll, the "Sunday morning" poll. The original transducer response received in the first Sunday morning poll after system start-up is passed over line 303 and stored in stage 300, and this value is not changed thereafter. In each subsequent weekly poll, the response on line 207 is passed over line 304 to the algebraic summation stage 301, in which the original transducer response (from stage 300) is subtracted, providing a resultant output signal on line 305. Stage 302 is a simple comparator to determine whether the amplitude of the signal on line 305—and thus the extent of the transducer response change—falls within an acceptable range. In the event the extent of the signal variation is greater than that denoting an acceptable range, a signal is provided on line 307 to indicate maintenance is required. Such a signal can be a visual signal, such as illuminating a lamp in a panel, or an audible signal varying in some predetermined manner, or physical displacement of a "flag" or indicator, or some other indication. The precise device and manner of using the "maintenance required" signal is not critical. It is important to note this is an extremely useful signal, as it alerts the equipment user to the need for maintenance before a malfunction or erroneous signal can occur.

Another important feature of the invention is that selective and remote calibration of any transponder can be effected. This can be accomplished at any transponder, by changing the five address select switches (21–25, FIGS. 8 and 9) to register address 31. The controller is then operated to examine the calibration voltage returned from this transponder and, if the voltage falls within acceptable limits, to indicate this by illuminating the LED at the transponder. Other actions, such as setting of the relay, can be used to indicate the acceptable range of the calibration voltage. If the calibration return is not within the preset limits, a variable resistor (105, FIGS. 8 and 9) is adjusted until the calibration is correct as signalled by the LED. After the correct calibration is verified, the address select switches are returned to their original settings.

Figure 16:
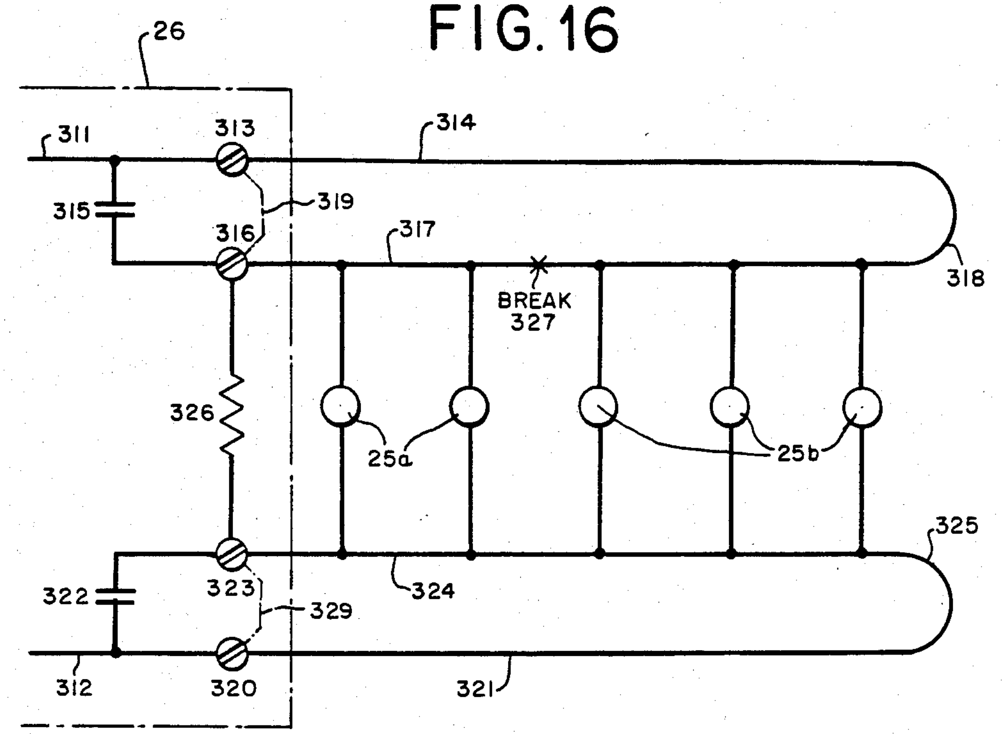
FIG. 16 is a schematic diagram of a Class A arrangement, useful in understanding certain advantages of this invention.

FIG. 16 shows a general arrangement of a Class A system with a plurality of transponders 25*a* and 25*b* connected for energization over the loop. Controller 26 includes a pair of conductors 311, 312 over which the voltage signals are sent and received. Conductor 311 is coupled to a screw terminal 313 and a conductor segment 314. Conductor 311 is also coupled over a normally-open contact set 315 to another screw terminal 316, which is connected to another conductor segment 317. Segments 314, 317 are connected by a short conductor segment 318 to form a continuous electrical circuit extending from line 311, over screw terminal 313, line segments 314, 318, 317, and screw terminal 316.

Line 312 is coupled over another screw terminal 320 to line conductor segment 321. Line 312 is also coupled over a normally-open contact set 322 and another screw terminal 323 to a conductor segment 324. A short segment 325 of a line conductor completes the electrical path between segments 321 and 324. A resistor 326 is coupled between terminals 316 and 323, to provide the function of resistor R2 in FIG. 3.

In normal operation it is apparent that an energizing potential difference and voltage signals can be applied to all of the transponders over conductors 311, 312. For example, when the potential on line 311 is positive with respect to that on line 312, current flows from line 311 over terminal 313, line segments 314, 318 and 317, transponders 25*a* and 25*b*, line segments 324, 325 and 321, and screw terminal 320 to conductor 312. Suppose however that a break occurs in line segment 317 at the location designated 327. All transponders would no longer be in the loop over the just-described circuit. Transponders 25*b* still receive power, but are not connected to resistor 326; therefore data from transponders 25*b* cannot be received at resistor 326. Transponders 25*a* are no longer powered and therefore cannot function. In accordance with normal Class A operation, when this occurs contact sets 315 and 322 would be closed by means not illustrated but well-known and understood). In spite of the break, the three transponders 25*b* to the right in FIG. 16 are now again connected to resistor 326, and transponders 25*a* are now energized as current flows from line 311 over contact set 315, screw terminal 316, and line segment 317 to the transponders 25*a*. In earlier arrangements the contact sets were closed and it was assumed that the transponders were returned to service by this operation. However, with the present invention there are advantages not obtainable with previous Class A systems.

For Class A operation with the present invention, contact sets 315, 322 are closed, the transponders are again polled, and the addresses of the replying transponders are noted. If all transponders are now replying, then the application of the Class A circuit restored proper operation of the system. This demonstrates that there was only one break on one or both sides of the loop. This proof that the system is again fully operational is not available from prior art systems. Hence, the operation of the present invention with a Class A system is a substantial advantage over prior arrangements.

There may be two or more breaks in the conductor loop including segments 314, 318 and 317, or in the other loop. With prior art Class A systems, the normally-open contact sets 315, 322 would be closed. However, with those earlier arrangements, there is not positive recognition that the contact closure, or other Class A circuitry, has failed to restore the system, and that the transponders are non-operative. With the present invention, those transponders are polled and it is determined, from the failure to respond, that the system is inoperative by reason of a multiple break, and those transponders still not replying are specifically and individually identified.

To illustrate Class B wiring, FIG. 16 is modified as follows. Line segments 314 and 318 are removed, and replaced by a jumper 319 connecting screw terminals 313 and 316. Likewise on the other loop, line segments 321 and 325 are removed, and replaced by a jumper 320. With a single break as shown at 327, the location of the break can be determined as being between two specific detectors. In the modified system of FIG. 16, the controller polls the system and notes the addresses of those transponders which do not respond. If all transponders on the loop are sequentially addressed, then the break is located between the last responding transponder and the first transponder not responding. With additional information it is also possible to locate the break with non-sequentially addressed transponders.

Figure 17:
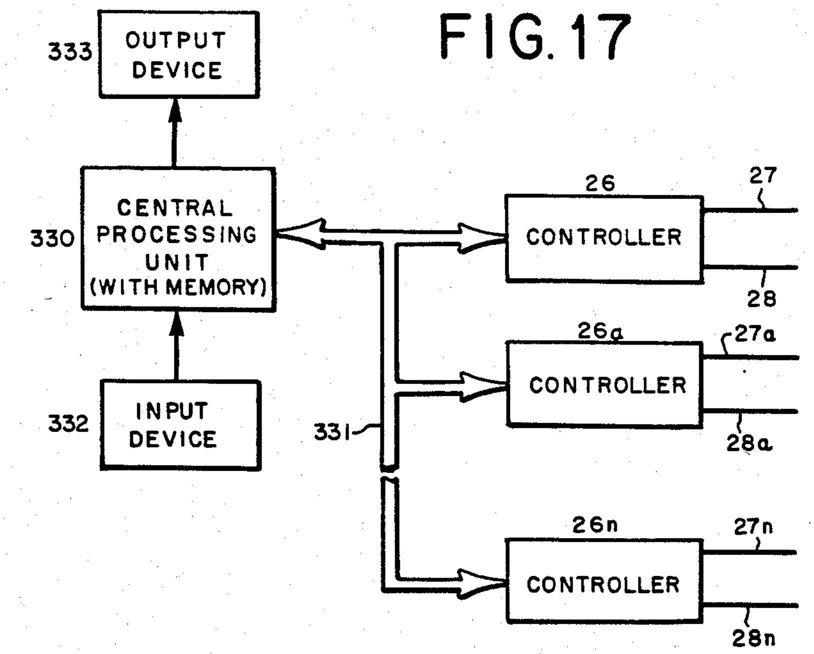
FIG. 17 is a block diagram useful in understanding the signal processing in the present invention.

The term "controller", as used herein and in the appended claims, refers not only to the controller 26 shown in FIG. 3, but also to a central processing unit (CPU) and its associated program. FIG. 17 illustrates the association of a CPU 330, over a bus 331, with a plurality of controllers designated 26, 26*a*, up to 26*n*. A plurality of controllers 26, 26*a*, . . . 26*n*, can share the storage and processing capability of a single CPU. In addition, input device(s) 332, such as a keyboard, can be coupled to the CPU to insert information such as a request for a response from a particular transponder in a designated zone. Suitable output device(s) 333, such as a printer, loudspeaker, CRT display, or other arrangement can be provided to indicate the status of the data processed by the CPU. Accordingly, it is again emphasized that the term "controller" includes not only the actual control circuits but also a central processing unit, at least on a shared basis. Those skilled in the art will recognize that a CPU on a chip (integrated circuit chip) can be provided with the controller circuitry in a compact arrangement.

With this understanding of the controller, it is appropriate to emphasize the substantial flexibility which such a controller imparts to the inventive system, and the broad extent of the information included in the controller output signals. This will be set out in connection with FIGS. 18, 19A–19F, and 20A–20F. While these waveforms are not precisely to scale, one inch on the abcissa of each waveform represents a time duration at 32 ms.

Figure 18:
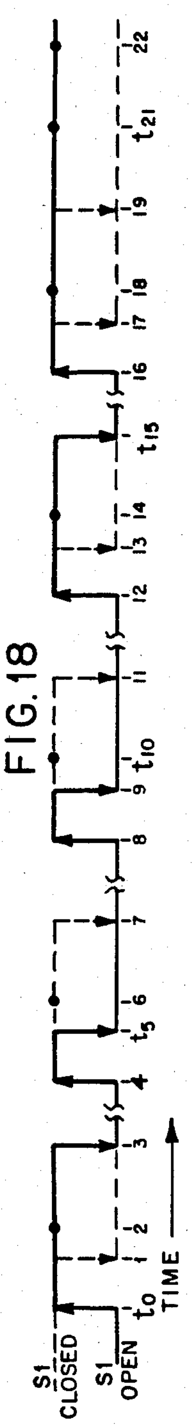

Considering first the showing in FIG. 18, the 5 pulses there shown include 4 pulses of one pulse group representing both information and a particular transponder address, akin to the four-pulse groups shown in FIGS. 6A–6C, and an elongated pulse such as the signal shown at address 31 in FIG. 4. In FIG. 18 the low level of the pulses represents the condition with controller switch S1 (FIG. 3) open, and the high amplitude denotes the condition with S1 closed. The rise and fall of each pulse indicates a closing or an opening of switch S1.

In FIG. 18, the rise of the first pulse at time t0 is provided as switch S1 closes, and this conveys certain information. The switch closure and consequent pulse rise commands the previously-replying transponder to terminate its transmission, and further "tells" every transponder to increment its respective counter. This is done in order that the individual pulses, and thus the pulse groups, can be tallied so that the successively addressed transponders recognize their individual addresses. After S1 has been closed, if it remains closed for a predetermined minimum time (represented as the duration between t0 and t2), the command is given to the transponder to turn on its output #1. In the described system, this is represented by a signal at output pin 1 of the output driver array 135 in FIG. 9. The other output pins 2–4 are also related to the commands embodied in the second, third and fourth pulses in FIG. 18. Because the pin 1 connection of the output driver is not used at this time, the fact that the command issued by stretching the first high pulse past t2 does not produce an output action. At time t3 S1 is opened, the pulse goes low, and this action tells the addressed transponder to terminate its output #1 (by removing the signal from pin 1 in FIG. 9), and also for the transponder to begin transmitting its calibration data. Note that if the pulse had gone low at time t1, this indicates that the #1 output of the addressed transponder is not to be turned on.

After time t3, if switch S1 is left open in the controller, the duration of the low level signal between t3 and t4 can be up to 32 ms, in that 32 ms was the time duration chosen for the preferred embodiment. Of course, the low level signal is continuously sampled as has been explained to determine where the transition occurs, and thus indicate the actual value of the calibration data returned to the oontroller. If the controller does not desire the return of calibration data from the addressed transponder, S1 is again closed after only 1 or 2 ms so that the time between t3 and t4 would thus be 1 or 2 ms. It is apparent that each rise and fall of every pulse in the pulse group provides information and/or commands to the addressed transponder, or to all the transponders.

At time t4 S1 is closed and the pulse goes high, either terminating the transmission of calibration data or preventing it, and incrementing the counters of all the transponders. Switch S1 is again opened at time t5 and the pulse goes low, before the time (t6) at which the high level pulse would have commanded the transponder to turn on its output #2. In this case that would have meant driving pin 2 of driver array 135 high (FIG. 9), and illuminating LED 81 (FIGS. 7 and 8). However, the pulse did go low at time t5, which signifies that there is no action to be taken at the #2 LED output. During the time between t5 and t8, the transponder is allowed to return the ID data. Had the pulse gone high soon after t5, the transponder would not have been allowed to return this data.

At time t8 S1 is again closed and the pulse goes high, terminating the transmission of ID data and incrementing all the counters. The third pulse remains high, with switch S1 open, only to t9. At this instant S1 is opened, prior to the time (t10) to which the high pulse level must be extended to command the transponder to drive pin 3 high in the driver array 135, an action which commands the setting of relay 75 (FIG. 7). Thus the opening of switch S1 at time t9 is in effect a command not to set the relay. The pulse remains low to t12, an extended time during which the transponder is allowed to return information corresponding to the analog 1 input, on line 70 in FIGS. 7–9. The analog value of this signal is derived in the transponder as explained above in connection with FIGS. 11–15. At time t12 switch S1 is again closed, sending the pulse level high in FIG. 18, terminating the response from the replying transponder and incrementing all the counters.

The fourth pulse must remain high for a predetermined time interval, represented as the distance between t12 and t14, to order the transponder to turn on its ouput #4 and thus reset the relay. Had the pulse gone low at time t13, the practical effect is to tell the transponder not to reset the relay. However, the pulse remained high past t14 to time t15, and thus the command is issued and the relay is reset. Between times t15 and t16, the transponder attempts to return the information from the second analog device, received over conductor 71 as shown in FIGS. 7–9. However, as shown in FIG. 18, it is assumed that switch S1 is closed after only 1 or 2 ms, which in effect tells the transponder not to transmit the data from the second analog device. At time t16 S1 is again closed and the pulse level goes high, preventing transmission of the analog 2 information and incrementing all the counters.

The four pulses just described constitute one pulse group, addressing a single transponder. Thus at time t16 the address of the next transponder in the address sequence (which is not necessarily the next in physical location) is commenced. The fifth pulse stays low past time t22. Had the pulse gone low by opening S1 at t17, the effect would have been to command the transponder not to turn on its #1 output. By staying high past t18, the command is issued to turn on the #1 output. At t19, the timing circuit recognizes (in this embodiment) that the #1 output should be terminated. The pulse remains high past t21 and t22, and at time t22 all the transponders recognize that this extended high pulse is a reset pulse, and the counters in all the transponders are thus reset. This description emphasizes the extraordinary amount of information and command signals packed into a single pulse group in the interactive system of this invention.

Figure 19A:
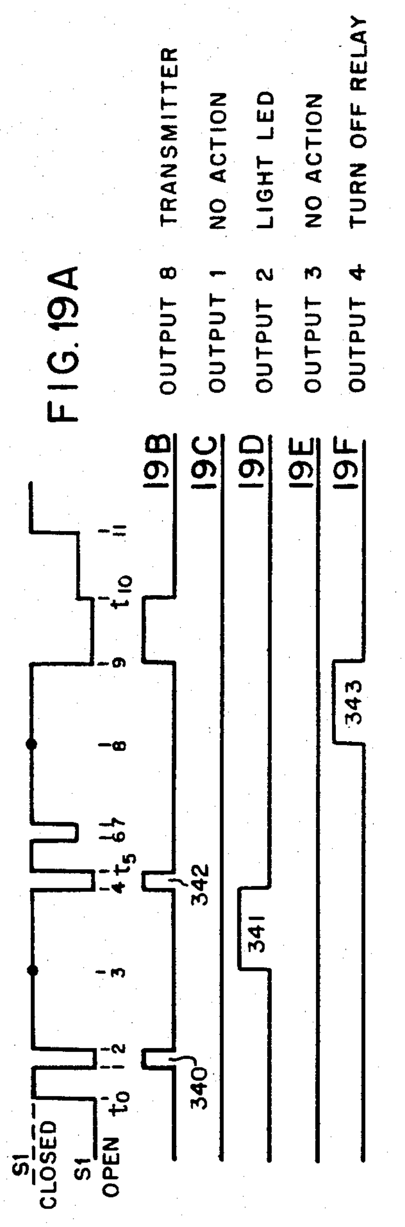
Figure 20A:
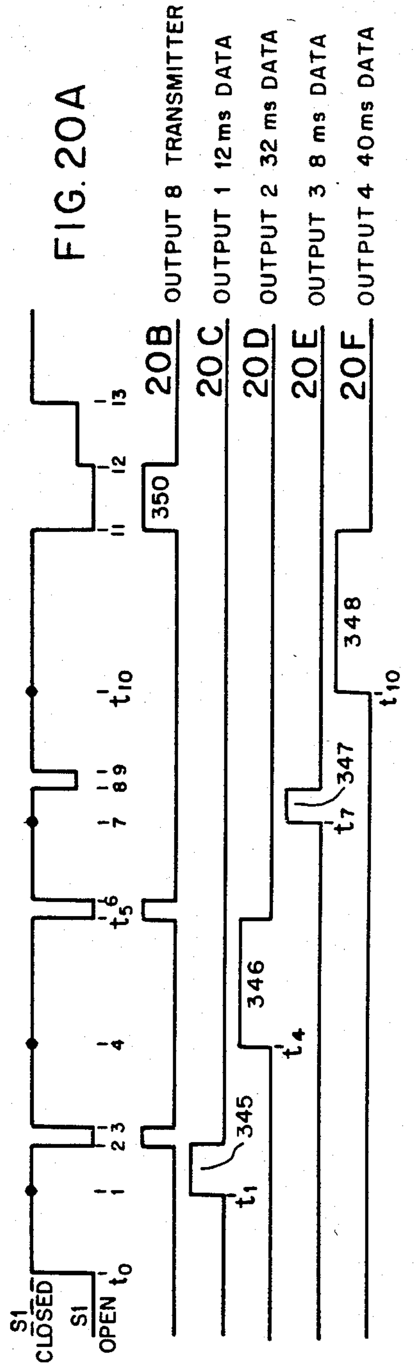

FIGS. 19A–19F indicate one pulse group of signals from the controller in FIG. 19A, and the transponder's response or non-response to each pulse in the group in FIGS. 19B–19E. The waveforms in FIGS. 19B–19E depict the signals at the respective output pins 8 and 1–4 to the right of ICl in FIG. 8 and to the right of output driver array 135 in FIG. 9. The legend "transmitter" at the right of FIG. 19B indicates that every time the waveform in 19B goes high, pin 8 goes high and attempts to transmit information from the transponder to the controller. The other four outputs indicate responses developed as a function of the command information in FIG. 19A.

In more detail, FIG. 19A shows that at time t0 S1 is closed, and the first pulse is initiated. S1 remains closed until t1, a time duration too short to produce a response at output pin 1, and at t1 switch S1 is opened. At this time pin 8 goes high and the transponder attempts to reply, as indicated by pulse 340 in FIG. 19B. However, at time t2 S1 is again closed to terminate the first command pulse, and as the controller pulse goes high the pulse 340 at the transponder is terminated as shown. Because of the short duration of the first command pulse, that is, the high portion between t0 and t1, no action was commanded and there is no change in the output at pin 1, as depicted by FIG. 19C.

At time t2, switch S1 is closed and remains closed past the minimun time, shown at t3, required for a command for output 2 to go high. Accordingly, the output of pin 2 goes high as shown at the leading edge of pulse 341 in FIG. 19D. Pulse 341 is that used at output pin 2 to turn on LED 81, as already described. Thus the LED is energized between t3 and t4 while switch S1 remains closed in the controller. At t4 switch S1 is opened, pulse 341 is ended, and the LED is deenergized. At this time the transponder attempts to return information, as shown by pulse 342 in FIG. 19B. However, the time duration between t4 and t5 is too brief to allow the return of the ID data, and pulse 342 is terminated when switch S1 is again closed at time t5.

The third pulse in the group of FIG. 19A remains high for a short period, too brief to command any action at output pin 3. Thus the waveform at pin 3 remains low as shown by FIG. 19E. At time t6 S1 is opened and the third pulse goes low as shown in FIG. 19A, but not as low as the previous lows in the pulse group. This occurs because the third low includes the time interval during which the first analog voltage is returned from a connected device. The reduced-amplitude low indicates there is no such device connected at the transponder then replying. Had there been a device providing a zero level signal, the third pulse low would have been at the same level as the previous lows.

At time t7 S1 is closed to commence the fourth pulse in the group. The pulse remains high past time t8, indicating a command to drive output pin 4 high and effect the corresponding action. In this case the action is to reset the associated relay, and at time t8 the leading edge of pulse 343 (FIG. 19F) is generated at pin 4 to accomplish this reset. Pulse 343 remains high until t9, when S1 in the controller is again opened to terminate the command and at that same time pulse 343 is also terminated. The fourth low commences at t9, and the extension of this low allows pin 8 to go high and remain high, returning information from the second analog device. At t10 pin 8 again goes low, simultaneously with the transition in the fourth low as already described, and this condition remains until t11. At t11 the described pulse group is terminated and the next pulse group is initiated.

From the description in connection with FIG. 18 and FIGS. 19A–19F, the flexibility of the system in transmitting commands and receiving information is manifest. However, those skilled in the art will appreciate that the system can also transmit other data information, by regulating the S1 closure time and thus the duration of the controller pulse highs, and also receive various information from the transponders and/or associated transducers. One example of such additional data transmission is evident from considering FIGS. 19A and 19D. Because the second pulse remained high for more than 20 ms (the preset time in this embodiment), represented at t3, the LED was illuminated. Pulse 341 shows the duration of this illumination was about another 20 ms. Of course, the pulse 341 could have been shortened, or could have been lengthened beyond 20 ms, to convey different information. That is, the duration of such pulse can itself signify information either to equipment connected at the transponder, or to personnel viewing the transponder operation.

Such control of the switch S1 to pass data signals is depicted in FIGS. 20A–20F. The controller output pulses in FIG. 20A are again four in number, constituting a pulse group. The first pulse goes high at time t0 and remains high, with switch S1 closed, past t1, the minimum time to drive output pin 1 high and commence data transfer by producing the leading edge of pulse 345. This pulse remains high until time t2, when S1 in the controller is again opened, terminating pulse 345 at time t2. As shown this represents a pulse duration of about 12 ms, which can be a command to accomplish a certain function or a representation of an analog value corresponding to the pulse time duration.

At time t2 S1 is opened, and output pin 8 goes high as the transponder attempts to reply. However, after only 4 ms switch S1 is again closed, the second pulse in the transmission group is commenced and the attempted output of the transponder is terminated as pin 8 goes low at time t3.

The second pulse remains high as S1 remains closed past t4, the minimum time to command a function to pass information to output 2 of the transponder. Thus at t4 the leading edge of pulse 346 in FIG. 20D is generated, and this pulse remains high until the controller switch S1 is again opened, at time t5. This opening of S1 terminates pulse 346, and allows pin 8 to go high as the transponder attempts to reply, but this attempt is terminated at t6 as switch S1 is closed. Thus the generation of pulse 346 represents a 32 ms data pulse forwarded to the addressed transponder.

The third pulse remains high past t7, at which time the leading edge of pulse 347 is generated as output pin 3 goes high. The duration of this pulse between t7 and t8 denotes an 8 ms interval, and S1 is opened at t8 to terminate this pulse. The transponder does not attempt to reply between t8 and t9 because there is no device connected to supply the analog 1 signal.

At t9 the fourth controller pulse is initiated as S1 is again closed, and S1 remains closed past t10, at which time output pin 4 goes high and pulse 348 is initiated. Pin 4 remains high until time t11, when controller switch S1 is opened to terminate pulse 348 after a 40 ms data transmission. At time t11 output pin 8 goes high and the transponder returns the pulse 350 until time t12, where the transition occurs in the fourth low of the pulse group. This last pulse in the group ends at t13, at which time the counters are incremented and the next transponder begins to respond to the pulse group.

SUMMARY OF TECHNICAL ADVANTAGES

The system of the present invention, by its use of a bidirectional, interactive communication system provides many advantages over prior art systems. As used herein and in the appended claims, a "bidirectional" communication system is one in which commands and/or information are transmitted from a source (controller) to a receiver (transponder) over a communication path such as a conductor pair, and data and/or status information may be selectively transmitted from the receiver over the same communication path to the source. The term "interactive" describes a communication system in which command and/or data information is included in a pulse group, comprising more than one pulse, transmitted from the source to the receiver and, before that one pulse group is terminated, selected data and/or status information will always be transmitted from the receiver to the source, until the source terminates the receiver'transmission with an overriding, simultaneous transmission. The receiver does not transmit additional pulse(s), but modifies one (or more) of the source-generated pulses, and this modification is translated into appropriate data by the source.

The unique, interactive system of this invention has many important advantages over known arrangements. Among the more salient features are:

1. Vernier measurement in the controller to enhance accuracy of the answer signal;

2. Accurate decoding of data from the replying transponder, even though another transponder may be malfunctioning at that same time;

3. Decoding of the answer signal to recover (1) data from an associated transducer, (2) calibration response information from the replying transponder, or (3) identification data from the replying transponder;

4. Compensation of the transponder and transducer responses;

5. Automatic call for maintenance when extent of any compensation signal reaches a preset level;

6. Continuous determination of transducer sensitivity at the controller, which is remote from the transducer itself;

7. Use of the transducer sensitivity measurement in supervising all devices, and determining—at the controller—when alarm and trouble conditions occur;

8. Sensitivity adjustment for the remotely located transducer at the controller, which can be controlled constantly and automatically (e.g., by a stored program related to time of day and/or day of week) or manually (through a keyboard). The various transducers can be set to the same, or different, thresholds, and some or all of the transducers can have their respective thresholds changed at any time;

9. Supply of electrical power to the transponders and the transducers from the controller, over the same conductor pair which transfers the data; and 10. Unique supervision of Class A and Class B systems.

CLAIM INTERPRETATION

A "fire detection" system, as used in the appended claims, is not limited to a system using ionization detectors, obscuration detectors, rate of temperature-rise detectors, or any other particular detector type. Rather it broadly includes systems for detecting incipient and/or actual combustion.

In the appended claims the term "connected" means a d-c connection between two components with virtually zero d-c resistance between those components. The term "coupled" indicates there is a functional relationship between two components, with the possible interposition of other elements between the two components described as "coupled" or "intercoupled".

While only a particular embodiment of the invention has been described and claimed herein, it is apparent that various modifications and alterations of the invention may be made. It is therefore the intention in the appended claims to cover all such modifications and alterations as may fall within the true spirit and scope of the invention.

What is claimed is:

1. A fire detection system comprising a pair of electrical conductors, a controller connected to transmit data over the electrical conductors, a plurality of transponders coupled to said conductors, at least one of said transponders having means for returning other data to the controller, and a transducer coupled to the transponder returning data, which transponder includes means for returning said data as a function of the transducer response, and in which the controller includes means for storing a first data signal denoting transducer response data from the transponder, a subsequent data signal provides later transducer response information, and means is connected to compare the subsequent data signal against the first data signal, to provide a transducer compensation signal for use in the system.

2. A fire detection system as claimed in claim 1, in which a comparator stage is connected to provide a maintenance-desired signal when the amplitude of the transducer compensation signal reaches a preset level, thus automatically requesting maintenance for conditions such as dust accumulation on the transducer before an erroneous alarm can be initiated.

3. A fire detection system comprising a pair of electrical conductors, a controller connected to transmit data over the electrical conductors, a plurality of transponders coupled to said conductors for returning data to the controller, and a transducer coupled to one of the transponders, which transponder includes means for returning said data as a function of the transducer response, and in which the controller includes means for storing a limit signal, means for receiving a data signal denoting transducer response from the transponder, and means connected to compare the data signal against the limit signal, to provide a transducer sensitivity signal as represented by the difference between the limit signal for the particular transducer and the transducer response information provided by the data signal.

4. A fire detection system as claimed in claim 3, in which a plurality of transducers are respectively coupled to the individual transponders, and the sensitivity of all transducers is continually monitored, so that the alarm and trouble conditions for each transducer are determined at the controller.

5. A fire detection system as claimed in claim 3, in which said controller comprises means for adjusting said limit signal to provide adjustable sensitivity of the transducer, even though the transducer may be coupled to said conductors at a location remote from said controller.

6. A fire detection system as claimed in claim 3, in which said controller provides multiple limits for a given transducer.

7. A fire detection system as claimed in claim 5, in which the sensitivity is controlled constantly and automatically at the controller.

8. A fire detection system as claimed in claim 7, which a memory is provided in the controller to store a program for controlling the sensitivity.

9. A fire detection system as claimed in claim 4, in which means is provided for the selective change of the sensitivity of any transducer.

10. A fire detect ion system as claimed in claim 9 in which a keyboard is utilized in the selective sensitivity change.

11. A communication system comprising a pair of electrical conductors, a controller connected to transmit data over the electrical conductors, a plurality of transponders coupled to said conductors, at least one of said transponders having means for returning other data to the controller, and a plurality of transducers respectively coupled to the transponders for returning data, which transponders include means for returning said data as a function of each transducer response, and in which the controller obtains compensation data by originally polling the transponders at a controlled time when the supervised premises are in a desired state, such as a low-occupancy, quiescent condition, subsequently polling the transponders when the supervised premises are in a similar state, and using a comparison of data from the latest poll and at least one earlier poll to compensate the system for long-term component changes.

12. A communication system comprising a pair of electrical conductors, a controller connected to transmit data over the electrical conductors, a plurality of transponders coupled to said conductors, at least one of said transponders having means for returning other data to the controller, which transponder includes means for returning said data as a function of calibration response information, and the controller includes means for receiving the data denoting calibration response of the replying transponder to indicate accuracy of the system circuitry.

13. A communication system as claimed in claim 12 in which the controller continually supervises all the transponders in the system by monitoring the calibration response information from all transponders.

14. A communication system as claimed in claim 12, and further comprising means in the controller for storing calibration response information and summation means for utilizing subsequent data in comparison with the stored calibration response information to provide a transponder compensation signal for use in the system.

15. A communication system as claimed in claim 14, and further comprising a comparator, coupled to the summation means, for providing an output signal when the magnitude of the transponder compensation signal exceeds a preset level.

16. A communication system comprising a pair of electrical conductors, a controller connected to transmit data over the electrical conductors, a plurality of transponders coupled to said conductors, at least one of said transponders having means for returning other data to the controller, which transponder includes means for returning said data as a function of calibration response information, and the controller includes means for receiving the data denoting calibration response of the replying transponder to indicate accuracy of the system circuitry, in which the replying transponder includes an indicator, and means in the controller for recognizing when a returned calibration response signal is within preset limits and, upon such recognition, for actuating said indicator to verify that the calibration response signal from said one transponder is within said preset limits.

17. A communication system as claimed in claim 16, wherein said one transponder includes an adjustable component connected to effect a variation in said calibration response signal, thus allowing modification of the calibration response signal at the transponder until the signal is within the preset limits, as signalled by actuation of the indicator at said one transponder.

18. A communication system comprising a pair of electrical conductors, a controller connected to transmit data over the electrical conductors, a plurality of transponders coupled to said conductors, each of said transponders having output switch means operable to return other data to the controller, and characterized in that although a non-selected transponder has its output switch means shorted, the controller is nevertheless capable of recovering the data returned by the replying transponder.

19. A communication system comprising a pair of electrical conductors, a controller connected to transmit data over the electrical conductors, a plurality of transponders coupled to said conductors, each of said transponders having outpout switch means operable to return other data to the controller, and characterized in that althohgh: a non-selected transponder is replying simultaneously with a selected transponder, the controller has means for recovering the data returned from both the non-selected and selected transponders.

* * * * *

UNITED STATES PATENT AND TRADEMARK OFFICE

CERTIFICATE OF CORRECTION

PATENT NO. : 4,507,652

DATED : March 26, 1985

INVENTOR(S) : John Milton Wynne and William Robert Vogt

It is certified that error appears in the above—identified patent and that said Letters Patent is hereby corrected as shown below:

Column 30, line 66, cancel "detect ion" and insert -- detection --

Column 32, line 39, cancel "outpout" and insert -- output --.

Column 32, line 41, cancel "althohgh" and insert -- although --.

Signed and Sealed this

*Ninth* Day of *July 1985*

[SEAL]

*Attest:*

DONALD J. QUIGG

*Attesting Officer* *Acting Commissioner of Patents and Trademarks*